(12) United States Patent
Desfonds et al.

(10) Patent No.: US 7,471,378 B2
(45) Date of Patent: Dec. 30, 2008

(54) METHOD AND SYSTEM FOR DETERMINING A POLARIZATION DEPENDENT CHARACTERISTICS OF OPTICAL AND OPTO-ELECTRICAL DEVICES

(75) Inventors: Eric Desfonds, Gatineau (CA); Kirill Pimenov, Ottawa (CA)

(73) Assignee: DBM Optical Technologies, Inc., Lafayette, CO (US)

( * ) Notice: Subject to any disclaimer, the term of this patent is extended or adjusted under 35 U.S.C. 154(b) by 326 days.

(21) Appl. No.: 11/427,985

(22) Filed: Jun. 30, 2006

(65) Prior Publication Data
US 2007/0002321 A1    Jan. 4, 2007

Related U.S. Application Data

(60) Provisional application No. 60/695,185, filed on Jun. 30, 2005.

(51) Int. Cl.
*G01N 21/00* (2006.01)
*G01J 4/00* (2006.01)
(52) U.S. Cl. ............................ 356/73.1; 356/368
(58) Field of Classification Search ............... 356/367, 356/368, 73.1; 702/196
See application file for complete search history.

(56) References Cited

U.S. PATENT DOCUMENTS 5,371,597 A    12/1994   Favin et al.
6,504,604 B1 *  1/2003   Holland ................ 356/73.1
6,762,829 B2    7/2004   Babin et al.
7,292,322 B2 * 11/2007   Boroditsky et al. ........ 356/73.1

OTHER PUBLICATIONS

Telecommunications Industry Association, Measure of Polarization Dependence of Insertion Loss of Single-Mode Fiberoptic Components by a Mueller Matrix Method, TIA Document, TIA-455-198, FOTP-198, published by Telecommunications Industry Association 2002, Arlington, VA, USA, Dec. 2002.

* cited by examiner

*Primary Examiner*—L. G Lauchman
(74) *Attorney, Agent, or Firm*—Renner, Otto, Boisselle & Sklar, LLP

(57) ABSTRACT

The present invention relates to a method for determining a polarization dependent characteristic of an optical or opto-electronic device. Using the Mueller matrix data, a matrix M corresponding to a difference between a first and a second transmission spectrum is determined. The first and the second transmission spectrum correspond to a first Stokes vector and a second Stokes vector, respectively, with the second Stokes vector being opposite to the first Stokes vector. Eigenvalues of the matrix M are then determined and the first Stokes vector is determined by selecting the largest eigenvalue of the matrix M and determining a corresponding eigenvector. The second Stokes vector is then determined as a vector opposite to the first Stokes vector. Finally, the data indicative of the polarization dependent characteristic of the device are determined using the first and the second Stokes vector and the Mueller matrix data. This method is highly beneficial by providing highly accurate data related to polarization dependent parameters while simultaneously providing a nearly instantaneous result with minimum computational effort.

24 Claims, 34 Drawing Sheets

US 7,471,378 B2

METHOD AND SYSTEM FOR DETERMINING A POLARIZATION DEPENDENT CHARACTERISTICS OF OPTICAL AND OPTO-ELECTRICAL DEVICES

CROSS-REFERENCE TO RELATED APPLICATIONS

The present application claims the benefit of U.S. Provisional Application Ser. No. 60/695,185, filed Jun. 30, 2005, the disclosure of which is incorporated by reference in its entirety.

FIELD OF THE INVENTION

This invention relates to determination of polarization dependent characteristics of an optical or opto-electrical device and in particular to a method and system for determining polarization dependent characteristics based on Mueller matrix terms.

BACKGROUND OF THE INVENTION

To satisy requirements of modem telecommunication systems, designers and manufacturers of optical components are facing an increasing need for more complex optical components, designed to combine higher numbers of functions and channels in a single device. The integration of optical and electrical components into a single device became a major milestone of opto-electrical component design. Analogous to the integration of functions in electrical Integrated Circuits (ICs) opto-electronic functions are now integrated in Photonic Integrated Circuits (PICs). Use of semiconductor compounds such as InGaAsP/InP and GaAlAs/GaAs—having bandgaps corresponding to a wavelength range used in Wavelength Division Multiplexing (WDM) networks—allow integration of active and passive functions on a same semiconductor chip.

However, these anisotropic semiconductor compounds exhibit a relative permittivity —or dielectric constant—that varies as a function of the orientation of the electrical field of the Transverse Electro-Magnetic (TEM) wave traveling therethrough, making them highly polarization dependent, or birefringent. Modern design of PICs has to take into account this material property. The stochastic nature of the State of Polarization (SoP) of different WDM optical signals in an optical communication system necessitates design and manufacture of polarization-insensitive or polarization-compensated PICs.

High-level integration of passive and active functionalities found in state of the art PICs has forced the development of new testing and analysis strategies. U.S. Pat. No. 5,371,597 issued Dec. 06, 1994 to Favin et al. teaches a measurement technique to extract Mueller matrix terms of a Device Under Test (DUT) to provide Polarization Dependent Loss (PDL) spectra over a large wavelength range. However, the inherent birefringence resulting from overall boundary condition solution of multiple epitaxial layers needs to be carefully compensated to yield polarization insensitive PICs. To this end, a Polarization Dependent Frequency (PDf) shift—which corresponds to the birefringence-induced centre frequency variations—needs to be determined. This is achieved by determining the incident optical spectrum of the two extreme orthogonal SoPs, referred to as Transverse Electrical (TE) or horizontal electrical field and Transverse Magnetic (TM) or vertical electrical field modes. U.S. Pat. No. 6,762,829 issued Jul. 13, 2004 to Babin et al. teaches a technique based on a conventional use of Mueller calculus involving sampling of a large number of incident SoPs, where each SoP represents a point on the Poincaré sphere. For each of these points an output insertion loss spectrum or a responsivity spectrum is simulated. From the simulated spectra, specific parameters such as centre frequency and filter bandwidth are evaluated. However, this technique requires substantial computational efforts, is very time consuming and, therefore, is not suitable for testing PICs in a manufacturing process. Furthermore, this technique does not ensure orthogonality of the incident two extreme orthogonal SoPs.

It would be desirable to provide a method and system for determining polarization dependent characteristics based on Mueller matrix terms ensuring orthogonality of the incident two extreme SoPs. It would be further desirable to substantially reduce the computational effort needed to determine the polarization dependent characteristics, thus allowing volume testing based on Mueller matrix terms in a manufacturing process.

SUMMARY OF THE INVENTION

It is, therefore, an object of the invention to provide a method and system for determining polarization dependent characteristics of an optical or opto-electronic device based on Mueller matrix terms ensuring orthogonality of the incident two extreme SoPs.

It is further an object of the invention to provide a method and system for determining polarization dependent characteristics of an optical or opto-electronic device based on Mueller matrix terms involving substantially reduced computation.

In accordance with the present invention there is provided a method for determining polarization dependent characteristics of a device comprising:
a) receiving Mueller matrix data, the Mueller matrix data being indicative of wavelength dependent first row Mueller matrix elements of the device, the device being one of an optical and an opto-electrical device;
b) using the Mueller matrix data, determining a matrix M corresponding to a difference between a first and a second transmission spectrum, the first and the second transmission spectrum corresponding to a first Stokes vector and a second Stokes vector, respectively, with the second Stokes vector being opposite to the first Stokes vector;
c) determining eigenvalues of the matrix M;
d) determining the first Stokes vector by selecting the largest eigenvalue of the matrix M and determining a corresponding eigenvector;
e) determining the second Stokes vector, the second Stokes vector being a vector opposite to the eigenvector; and,
f) determining data indicative of the polarization dependent characteristic of the device using the first and second Stokes vector and the Mueller matrix data.

In accordance with an aspect of the present invention there is provided a storage medium having stored therein executable commands for execution on a processor, the processor when executing the commands performing:

receiving Mueller matrix data, the Mueller matrix data being indicative of wavelength dependent first row Mueller matrix elements of one of an optical and an opto-electrical device;
using the Mueller matrix data, determining a matrix M corresponding to a difference between a first and a second transmission spectrum, the first and the second transmission spectrum corresponding to a first Stokes vector and a second Stokes vector, respectively, with the second Stokes vector being opposite to the first Stokes vector;

determining eigenvalues of the matrix M;

determining the first Stokes vector by selecting the largest eigenvalue of the matrix M and determining a corresponding eigenvector;

determining the second Stokes vector, the second Stokes vector being a vector opposite to the eigenvector; and, determining data indicative of the polarization dependent characteristic of the device using the first and second Stokes vector and the Mueller matrix data.

In accordance with the aspect of the present invention there is further provided a system for determining polarization dependent characteristics of a device comprising:

an input port for receiving Mueller matrix data, the Mueller matrix data being indicative of wavelength dependent first row Mueller matrix elements of the device, the device being one of an optical and an opto-electrical device;

a processor in communication with the first port for:
   a) using the Mueller matrix data, determining a matrix M corresponding to a difference between a first and a second transmission spectrum, the first and the second transmission spectrum corresponding to a first Stokes vector and a second Stokes vector, respectively, with the second Stokes vector being opposite to the first Stokes vector;
   b) determining eigenvalues of the matrix M;
   c) determining the first Stokes vector by selecting the largest eigenvalue of the matrix M and determining a corresponding eigenvector;
   d) determining the second Stokes vector, the second Stokes vector being a vector opposite to the eigenvector; and,
   e) determining data indicative of the polarization dependent characteristic of the device using the first and second Stokes vector and the Mueller matrix data; and, an output port in communication with the processor for providing the data indicative of the polarization dependent characteristic of the device.

In accordance with the present invention there is further provided a method for determining polarization dependent characteristics of a device comprising:

a) receiving Mueller matrix data, the Mueller matrix data being indicative of wavelength dependent first row Mueller matrix elements of the optical device, the device being one of an optical and an opto-electrical device;

b) determining a set of first Stokes vectors and a set of second Stokes vectors, each Stokes vector of the set of second Stokes vectors being opposite to a corresponding Stokes vector of the set of first Stokes vectors, the set of first Stokes vectors substantially covering a surface of a hemisphere of a Poincaré sphere;

c) using the Mueller matrix data, determining for the first Stokes vector and the second Stokes vector of each pair of opposite first and second Stokes vectors a corresponding first and second transmission spectrum;

d) determining for each pair of opposite first and second Stokes vectors a normalized difference between the corresponding first and second transmission spectrum;

e) determining the pair of opposite first and second Stokes vectors having the largest normalized difference; and, f) determining data indicative of the polarization dependent characteristic of the device using the pair of opposite first and second Stokes vectors having the largest normalized difference and the Mueller matrix data.

In accordance with the present invention there is yet further provided a method for determining polarization dependent characteristics of a device comprising:

receiving Mueller matrix data, the Mueller matrix data being indicative of wavelength dependent first row Mueller matrix elements of the optical device, the device being one of an optical and an opto-electrical device;

using the Mueller matrix data, determining a set of insertion loss data and a set of center frequency data for each of a plurality of input states of polarization substantially covering a surface of a Poincaré sphere;

processing the set of insertion loss data and the set of center frequency data for determining extremes of insertion loss and extremes of center frequency;

determining a first and a second incident Stokes vector for each of the extremes of the insertion loss and the extremes of the center frequency;

determining an orthogonality parameter for the first and the second incident Stokes vector for each of the extremes of the insertion loss and the extremes of the center frequency, the orthogonality parameter having a predetermined value for indicating othogonality;

selecting the extreme and the corresponding first and second incident Stokes vector associated with the orthogonality parameter closest to the predetermined value; and, determining data indicative of the polarization dependent characteristic of the device using the selected first and second incident Stokes vector and the Mueller matrix data.

In accordance with the present invention there is yet further provided a method for determining polarization dependent characteristics of a device comprising:

receiving matrix data indicative of a wavelength dependent influence of the device on a light wave transmitted therethrough, the device being one of an optical and an opto-electrical device;

determining a set of first Stokes vectors and a set of second Stokes vectors, each Stokes vector of the set of second Stokes vectors being opposite to a corresponding Stokes vector of the set of first Stokes vectors;

using the matrix data, determining for the first Stokes vector and the second Stokes vector of each pair of opposite first and second Stokes vectors a corresponding first and second transmission spectrum;

determining for each pair of opposite first and second Stokes vectors a normalized difference between the corresponding first and second transmission spectrum;

determining the pair of opposite first and second Stokes vectors having the largest normalized difference; and, determining data indicative of the polarization dependent characteristic of the device using the pair of opposite first and second Stokes vectors having the largest normalized difference and the matrix data.

BRIEF DESCRIPTION OF THE FIGURES

Exemplary embodiments of the invention will now be described in conjunction with the following drawings, in which.

DETAILED DESCRIPTION OF THE INVENTION

Figure 1:
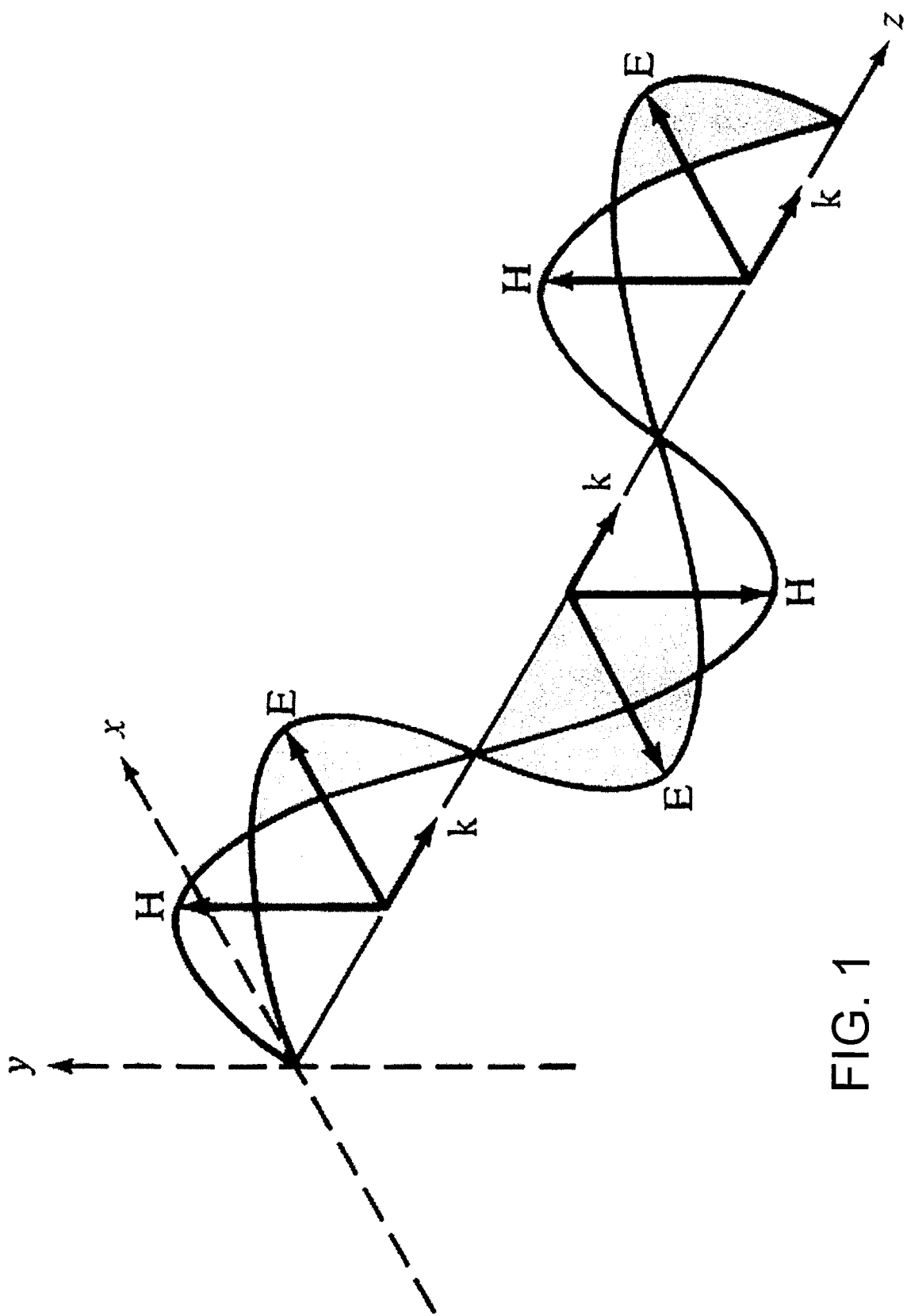
FIG. 1 is a diagram illustrating a TEM wave.

The SoP of a lightwave is determined by the electrical field $\vec{E}$ orientation of a TEM wave, as shown in FIG. 1. The electrical field of the TEM lightwave is the only component detected by photodetectors presently used in optical telecommunication networks. In the case of Planar Lightwave Circuits (PLCs), the orientation of the electrical field is used to define the TE- and TM-response of individual PLC building blocks and an overall DUT spectrum in the following description, a TEM wave with its electrical field component in the x-direction is called a TE-wave, while a TEM wave with its magnetic field in the x-direction is called a TM-wave. The propagation direction of the TEM lightwave is along the z-axis.

The influence of an optical or opto-electrical device on an incident lightwave is represented using a 4×4 matrix known as Mueller matrix. The Mueller matrix allows determination of intensity and polarization of an incoming light beam after its transmission through the optical or opto-electrical device. While the Mueller matrix is equivalent to the Jones matrix for completely polarized light, only the Mueller matrix is applicable in case of partially polarized light. Methods based on the Jones matrix also need known polarization states at both input port and output port, while the Mueller method needs only known incident states.

Transmission of light through the optical or opto-electrical device is then expressed as a product of its Mueller matrix and an incident Stokes vector representing the SoP of the incident lightwave:

$$\begin{bmatrix} T_0 \\ T_1 \\ T_2 \\ T_3 \end{bmatrix} = \begin{bmatrix} m_{00} & m_{01} & m_{02} & m_{03} \\ m_{10} & m_{11} & m_{12} & m_{13} \\ m_{20} & m_{21} & m_{22} & m_{23} \\ m_{30} & m_{31} & m_{32} & m_{33} \end{bmatrix} \begin{bmatrix} S_0 \\ S_1 \\ S_2 \\ S_3 \end{bmatrix} \qquad (1)$$

wherein $T_i$ terms represent the output Stokes vector, and $S_i$ terms represent the incident Stokes vector. The Stokes vectors are defined by using the following normalized Stokes parameters:

$S_0$ represents the total intensity of the input power, if kept equal to 1 only insertion losses from the optical or optoelectrical device are included in a simulated spectrum;

$S_1$ represents the ratio of Linear Horizontal Polarization (LHP) to Linear Vertical Polarization (LVP);

$S_2$ represents the ratio of Linear+45 degrees (L+45) Polarization to Linear −45 degrees (L−45) Polarization; and, $S_3$ represents the ratio of Right-hand Circular Polarization (RCP) to Left-hand Circular Polarization (LCP).

In equation (1) $T_0$ is the intensity of the transmitted or output lightwave, which is measured using, for example, a normal optical power meter. $T_1$ to $T_3$ relate to a polarization state of the output lightwave and can only be measured using special instruments such as a polarimeter. Taking only the $T_0$ term into account, equation (1) is simplified as follows:

$$[T_0] = [m_{00}\, m_{01}\, m_{02}\, m_{03}][S_0\, S_1\, S_2\, S_3]^T \qquad (2)$$

Applying standard rules of matrix multiplication equation (2) is rewritten as follows:

$$T_0 = m_{00}S_0 + m_{01}S_1 + m_{02}S_2 + m_{03}S_3 \qquad (3)$$

Using a DUT's Mueller matrix and modifying the incident Stokes vector allows simulation of the influence of various incident SoPs on the intensity $T_0$ of the output lightwave. Extracting the first row Mueller matrix terms for a plurality of predetermined wavelengths, for example, within a predetermined wavelength band, further allows simulation of the intensity $T_0$ of the output lightwave for each predetermined wavelength. Equation (3) then becomes:

$$T_0(\lambda) = m_{00}(\lambda)S_0 + m_{01}(\lambda)S_1 + m_{02}(\lambda)S_2 + m_{03}(\lambda)S_3 \qquad (4)$$

The difference between maximum and minimum insertion loss corresponds to the PDL for each predetermined wavelength, as disclosed, for example, in U.S. Pat. No. 5,371,597 issued Dec. 06, 1994 to Favin et al. The resulting spectra created from the individual maximum and minimum transmission at each predetermined wavelength are called the MAX spectrum and the MIN spectrum, respectively. At each predetermined wavelength the maximum and minimum values are termed $T_{0_{MAX}}(\lambda)$ and $T_{0_{MIN}}(\lambda)$. The following equations are used to extract these terms:

$$T_{0_{MAX}}(\lambda) = m_{00}(\lambda) + \sqrt{(m_{01}^2(\lambda) + m_{02}^2(\lambda) + m_{03}^2(\lambda))} \quad (5)$$

$$T_{0_{MIN}}(\lambda) = m_{00}(\lambda) - \sqrt{(m_{01}^2(\lambda) + m_{02}^2(\lambda) + m_{03}^2(\lambda))} \quad (6)$$

The resulting PDL($\lambda$) is then determined for each predetermined wavelength using the following equation:

$$PDL(\lambda) = 10 \, \log\left[\frac{T_{0_{MAX}}(\lambda)}{T_{0_{MAX}}(\lambda)}\right] [dB] \quad (7)$$

Figure 2A:
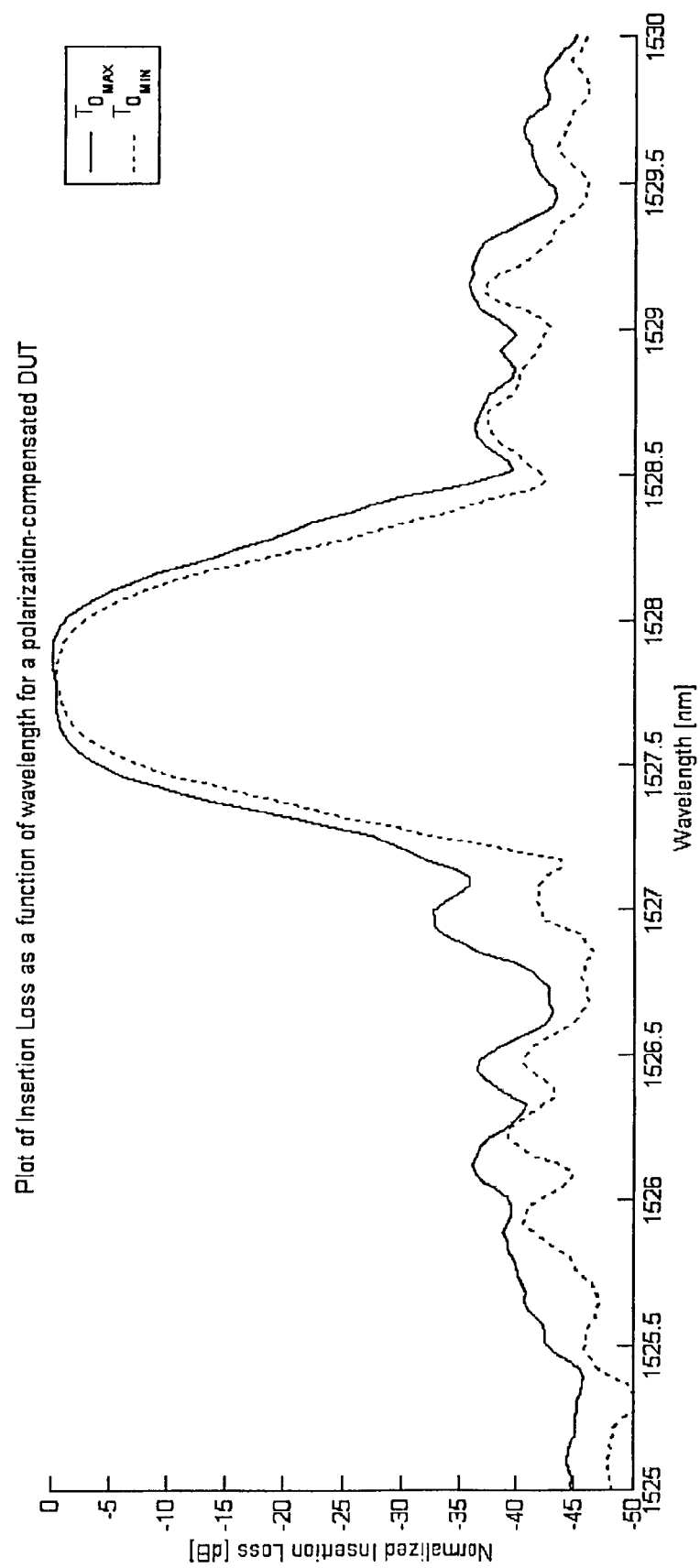
FIGS. 2a and 2b are diagrams illustrating insertion loss and PDL versus wavelength of a polarization compensated DUT.
Figure 2B:
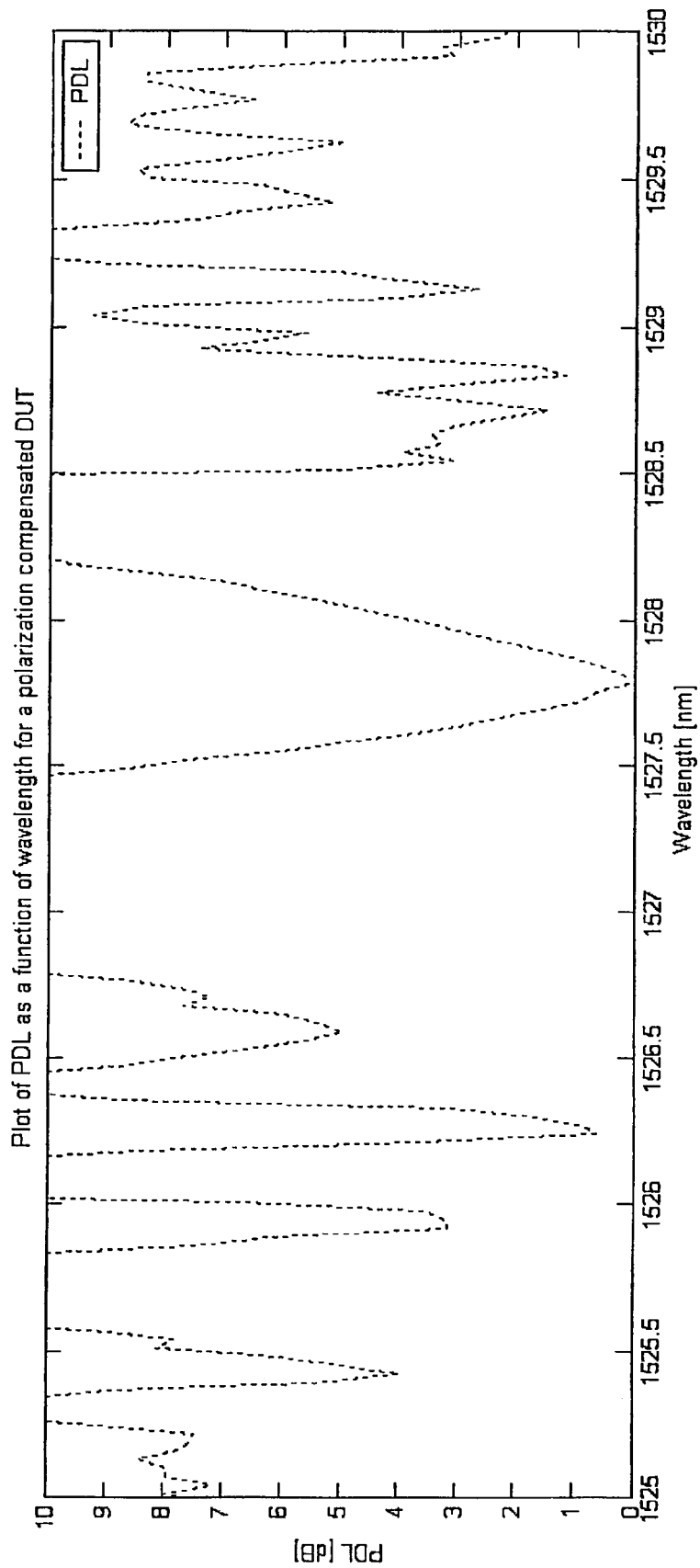

FIGS. 2a and 2b show the $T_{0_{MAX}}(\lambda)$ and $T_{0_{MIN}}(\lambda)$ spectra, FIG. 2a, as well as the PDL($\lambda$) spectrum, FIG. 2b, for a polarization compensated DUT. FIG. 2b shows that the PDL($\lambda$) is minimized in the main filter lobe, which is highly desirable.

Sampling various incident SoPs on the surface of the Poincaré sphere corresponds to changing a corresponding incident Stokes vector in equation (4). Keeping $S_0 = 1$, ensures that only the DUT's insertion loss is evaluated. The norm of the remaining Stokes vector terms $[S_1 \, S_2 \, S_3]$ is kept equal to 1. Thus, all sampling occurs on the surface of the Poincaré sphere where only fully polarized SoPs are found.

A polarization modification technique used in many polarization controllers to change the SoP of an incident light wave comprises the combined rotation of a quarter wave-plate $$-\frac{\lambda_0}{4}-$$

and a half-wave-plate $$-\frac{\lambda_0}{2}.$$

Figure 3:
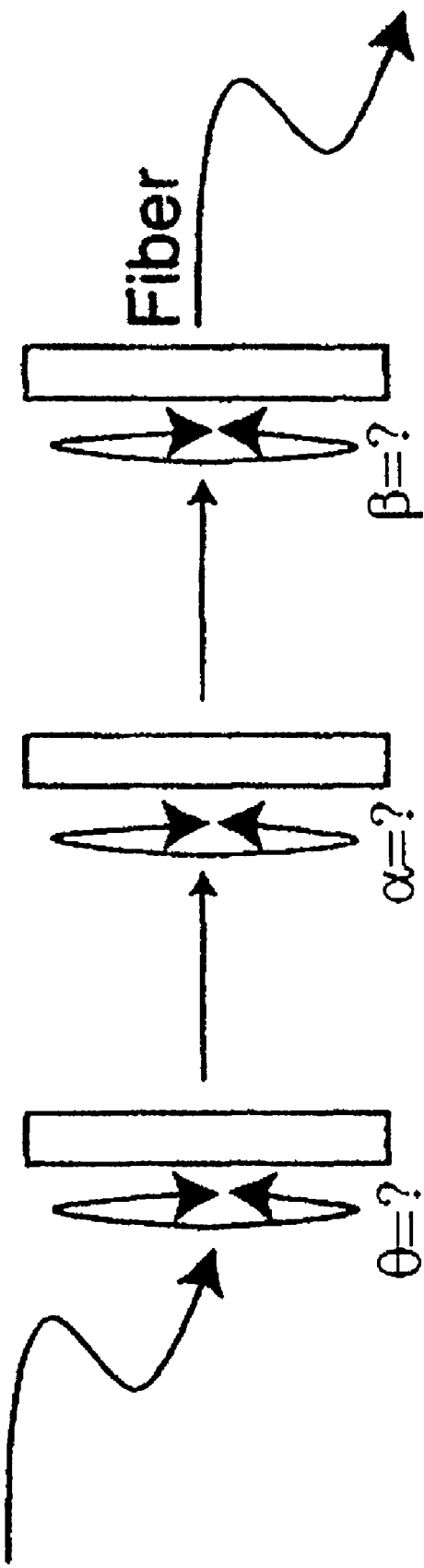
FIG. 3 is a simplified diagram illustrating a waveplate based polarization controller.

A linear polarizer is added to optimize the output lightwave by lining it up with the linear polarization of the incident light wave, as shown in FIG. 3. In SoP-simulations this approach is implemented by simulating the combined influence of the quarter-wave-plate and the half-wave-plate on a linear polarized incident light wave. Axes of the quarter-wave-plate and the half-wave-plate are set to angles $\alpha$ (varied between 0 and 180 degrees) and $\beta$ (varied between 0 and 90 degrees), respectively. Any fully polarized incident SoP is obtained by using the combination of the incident linear polarized light with the Mueller matrix of a quarter-wave-plate —$M_{\lambda_0/4}(\alpha)$— and the Mueller matrix of a half-wave-plate —$M_{\lambda_0/2}(\alpha)$:

$$\begin{bmatrix} S_0 \\ S_1 \\ S_2 \\ S_3 \end{bmatrix} = M_{\frac{\lambda_0}{2}}(\beta) M_{\frac{\lambda_0}{4}}(\alpha) \begin{bmatrix} 1 \\ 1 \\ 0 \\ 0 \end{bmatrix} \quad (8)$$

where:

the expansion of the half-wave-plate is:

$$M_{\frac{\lambda_0}{2}}(\beta) = \begin{bmatrix} 1 & 0 & 0 & 0 \\ 0 & \cos(4\beta) & \sin(4\beta) & 0 \\ 0 & \sin(4\beta) & -\cos(4\beta) & 0 \\ 0 & 0 & 0 & -1 \end{bmatrix},$$

and the expansion of the quarter-wave-plate is:

$$M_{\frac{\lambda_0}{4}}(\alpha) = \begin{bmatrix} 1 & 0 & 0 & 0 \\ 0 & \cos^2(2\alpha) & \cos(2\alpha)\sin(2\alpha) & -\sin(2\alpha) \\ 0 & \cos(2\alpha)\sin(2\alpha) & \sin^2(2\alpha) & \cos(2\alpha) \\ 0 & \sin(2\alpha) & -\cos^2(2\alpha) & 0 \end{bmatrix}.$$

The Stokes vector of a linear horizontal polarized light wave is:

$$\begin{bmatrix} 1 \\ 1 \\ 0 \\ 0 \end{bmatrix}. \quad (9)$$

Let $\xi = M_{\frac{\lambda_0}{4}}(\alpha) \begin{bmatrix} 1 \\ 1 \\ 0 \\ 0 \end{bmatrix},$ thus $$\xi = \begin{bmatrix} 1 & 0 & 0 & 0 \\ 0 & \cos^2(2\alpha) & \cos(2\alpha)\sin(2\alpha) & -\sin(2\alpha) \\ 0 & \cos(2\alpha)\sin(2\alpha) & \sin^2(2\alpha) & \cos(2\alpha) \\ 0 & \sin(2\alpha) & -\cos^2(2\alpha) & 0 \end{bmatrix} \begin{bmatrix} 1 \\ 1 \\ 0 \\ 0 \end{bmatrix},$$

$$\xi = \begin{bmatrix} 1 \\ \cos^2(2\alpha) \\ \cos(2\alpha)\sin(2\alpha) \\ \sin(2\alpha) \end{bmatrix}.$$

Merging equations (8) and (9) yields:

$$\begin{bmatrix} S_0 \\ S_1 \\ S_2 \\ S_3 \end{bmatrix} = M_{\frac{\lambda_0}{2}}(\beta)\xi = \begin{bmatrix} 1 & 0 & 0 & 0 \\ 0 & \cos(4\beta) & \sin(4\beta) & 0 \\ 0 & \sin(4\beta) & -\cos(4\beta) & 0 \\ 0 & 0 & 0 & -1 \end{bmatrix} \begin{bmatrix} 1 \\ \cos^2(2\alpha) \\ \cos(2\alpha)\sin(2\alpha) \\ \sin(2\alpha) \end{bmatrix},$$

which in turn results in:

$$\begin{bmatrix} S_0 \\ S_1 \\ S_2 \\ S_3 \end{bmatrix} = \begin{bmatrix} 1 \\ \cos^2(2\alpha)\cos(4\beta) + \cos(2\alpha)\sin(2\alpha)\sin(4\beta) \\ \cos^2(2\alpha)\sin(4\beta) - \cos(2\alpha)\sin(2\alpha)\cos(4\beta) \\ -\sin(2\alpha) \end{bmatrix} \quad (10)$$

Using equation (10), the term $T_0(\lambda)$ in equation (4) is then expressed as a function of the angles $\alpha$ and $\beta$ as follows:

$$T_0(\lambda) = m_{00}(\lambda) + m_{01}(\lambda)S_1(\alpha,\beta) + m_{02}(\lambda)S_2(\alpha,\beta) + m_{03}(\lambda)S_3(\alpha,\beta) \quad (11)$$

In a simple technique for sampling various incident SoPs on the surface of the Poincaré sphere, values of the angles $\alpha$ and $\beta$ are varied using two nested loops. To reduce the time needed for sampling the whole Poincaré sphere, a reduced wavelength range is used after a randomly selected pair of values for the angles $\alpha$ and $\beta$ is used to simulate the DUT's transmission spectrum for the complete operating wavelength range. This allows an initial guess of the center frequency—peak value of the resulting simulated transmission spectrum—to be made. Following this initial simulation, a cropping window is centered on the estimated center frequency to reduce the wavelength range used. The most significant polarization dependent variations are assumed to occur within the cropping window, while smaller variations outside the cropping window are omitted.

Figure 4:
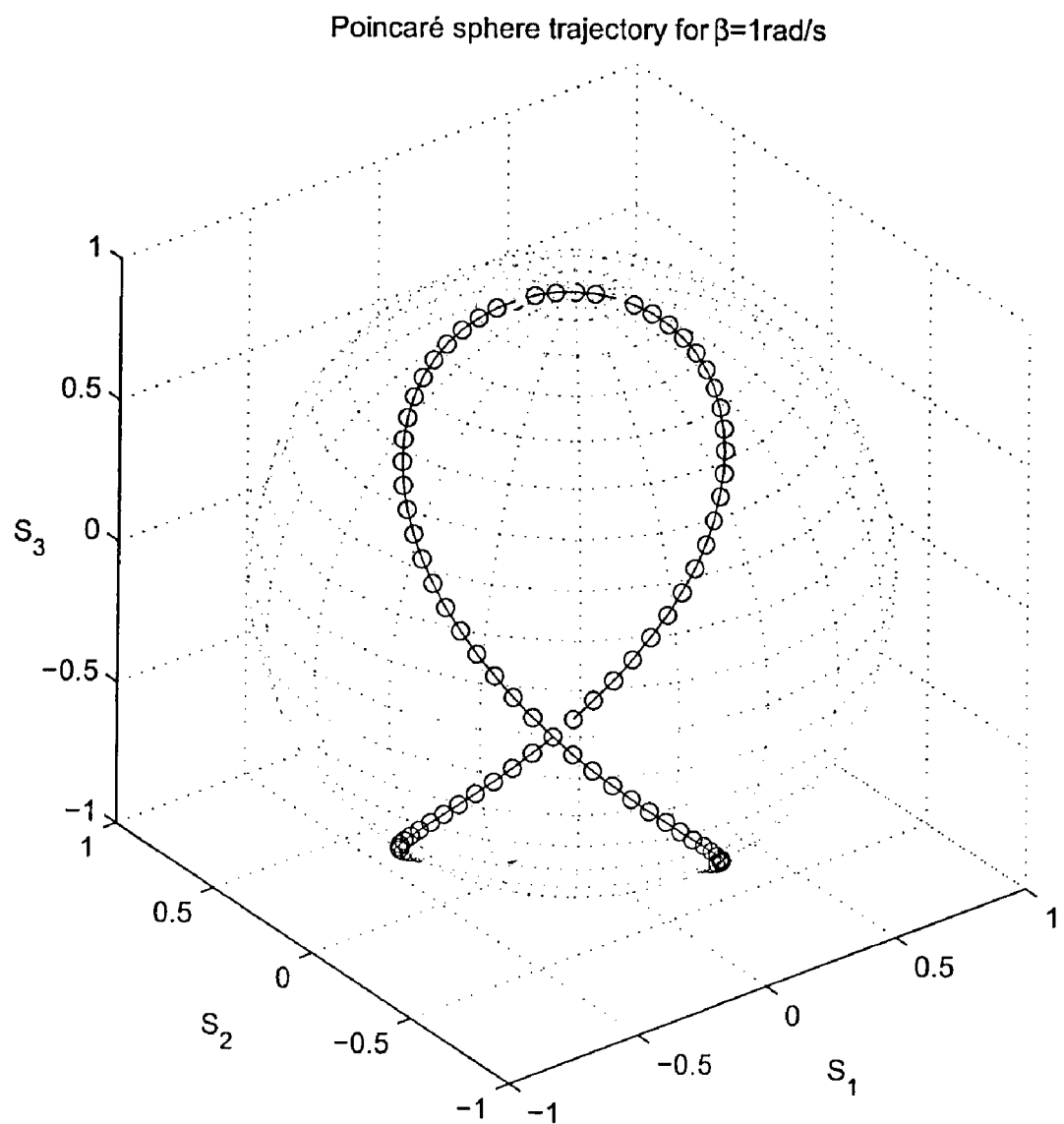
FIG. 4 is a diagram illustrating various SoPs on the surface of the Poincaré sphere.
Figure 5A:
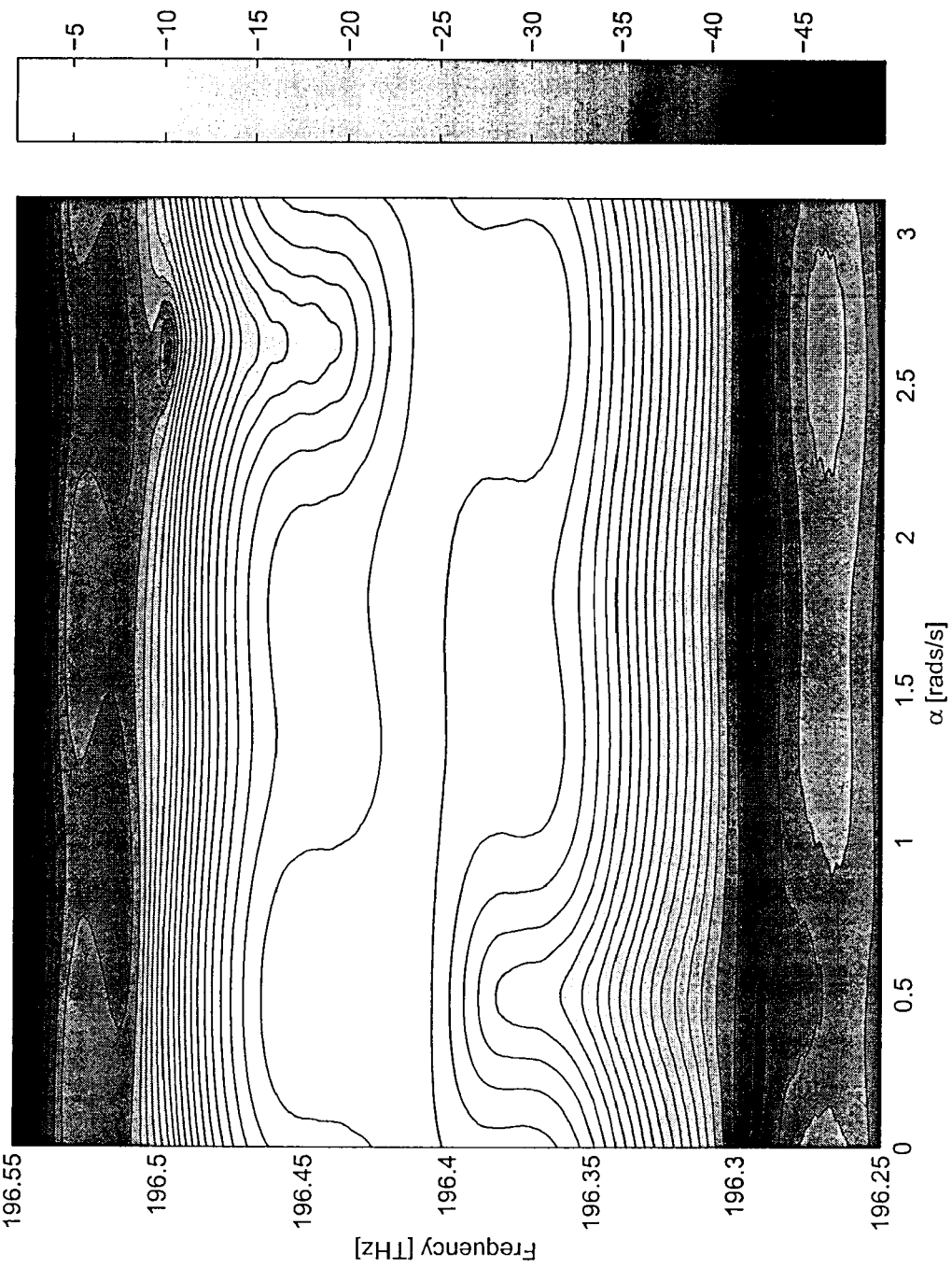
FIGS. 5a to 5d are diagrams illustrating various views of insertion loss versus frequency and angle α for a polarization uncompensated DUT.
Figure 5B:
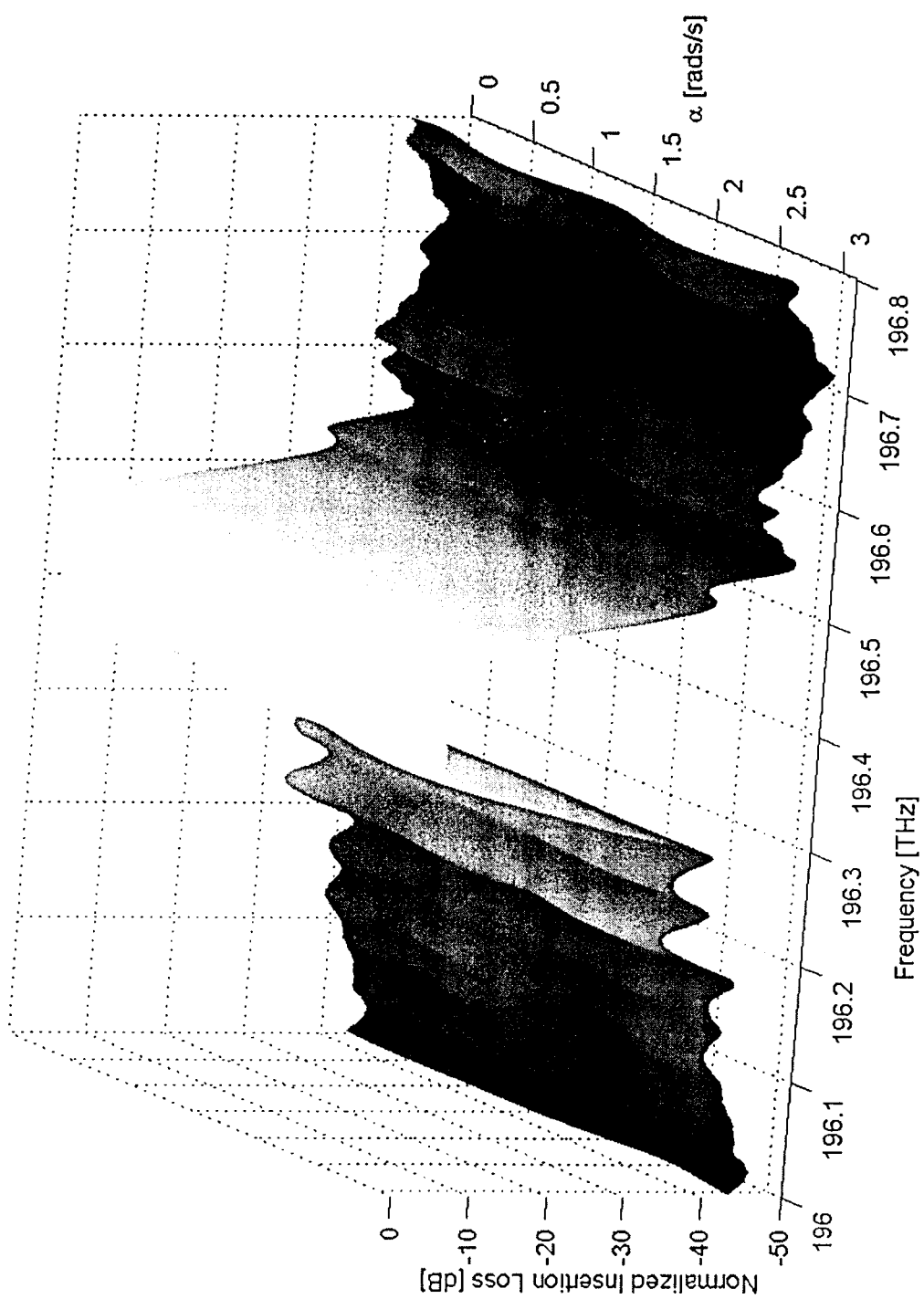
Figure 5C:
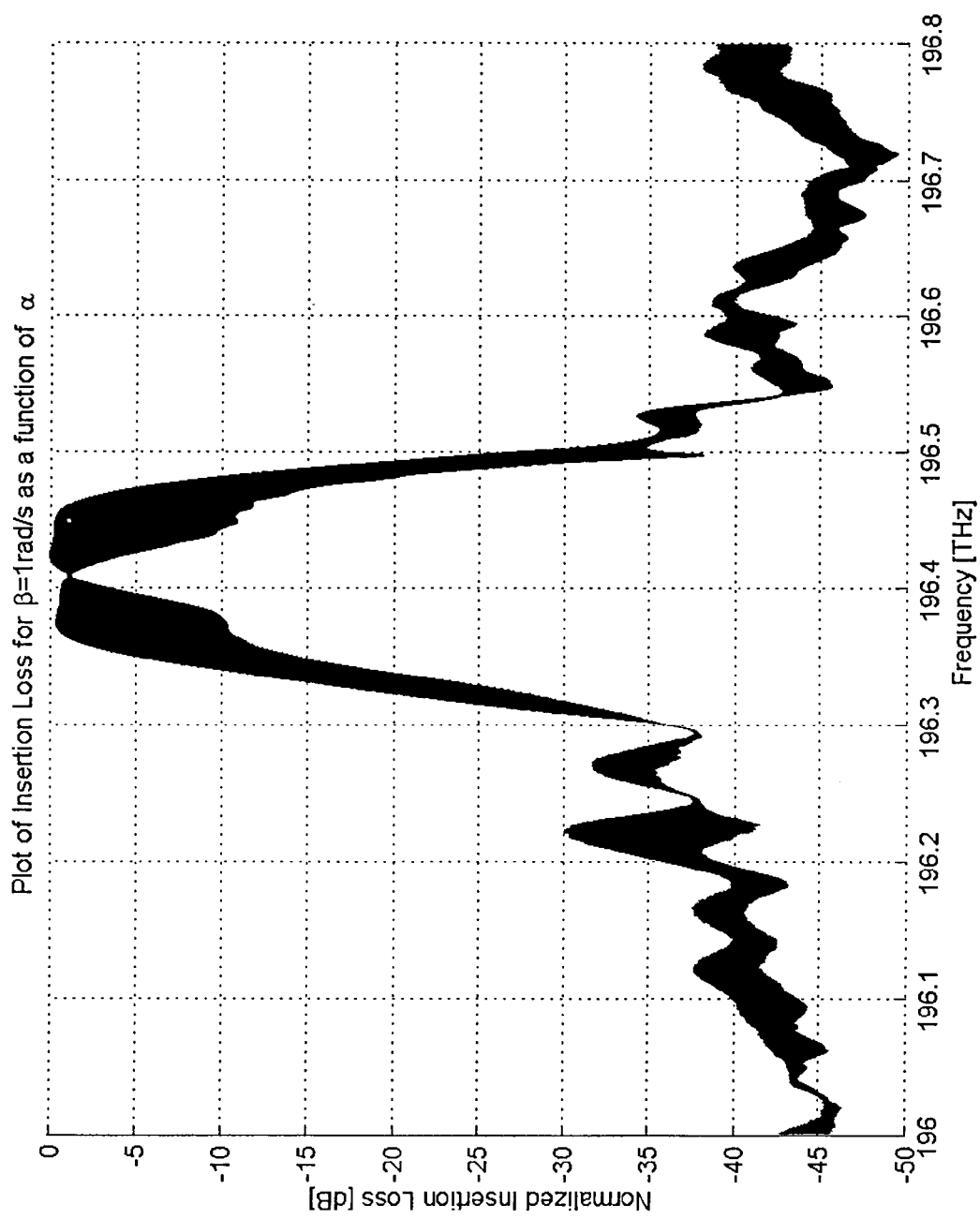
Figure 5D:
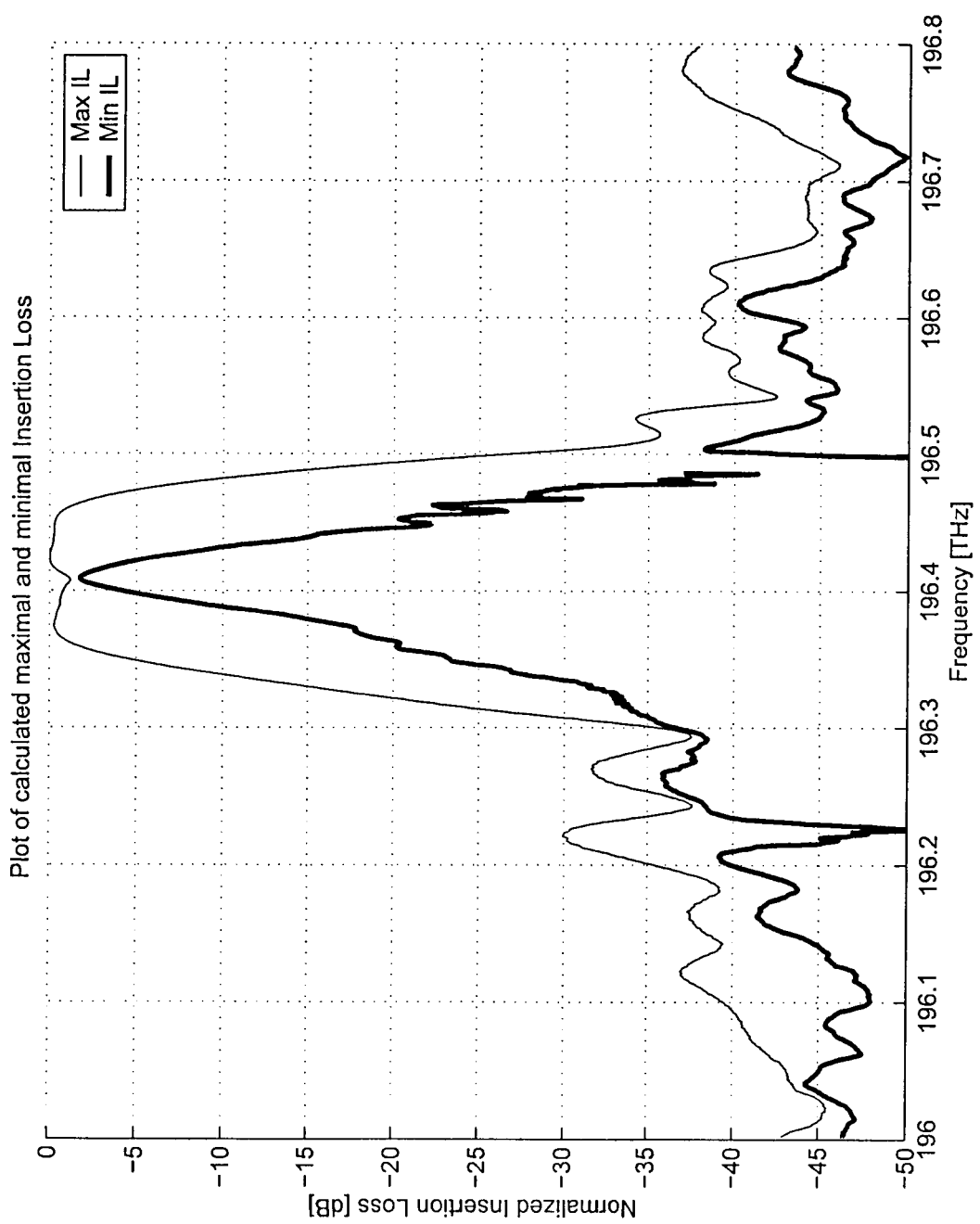
Figure 6A:
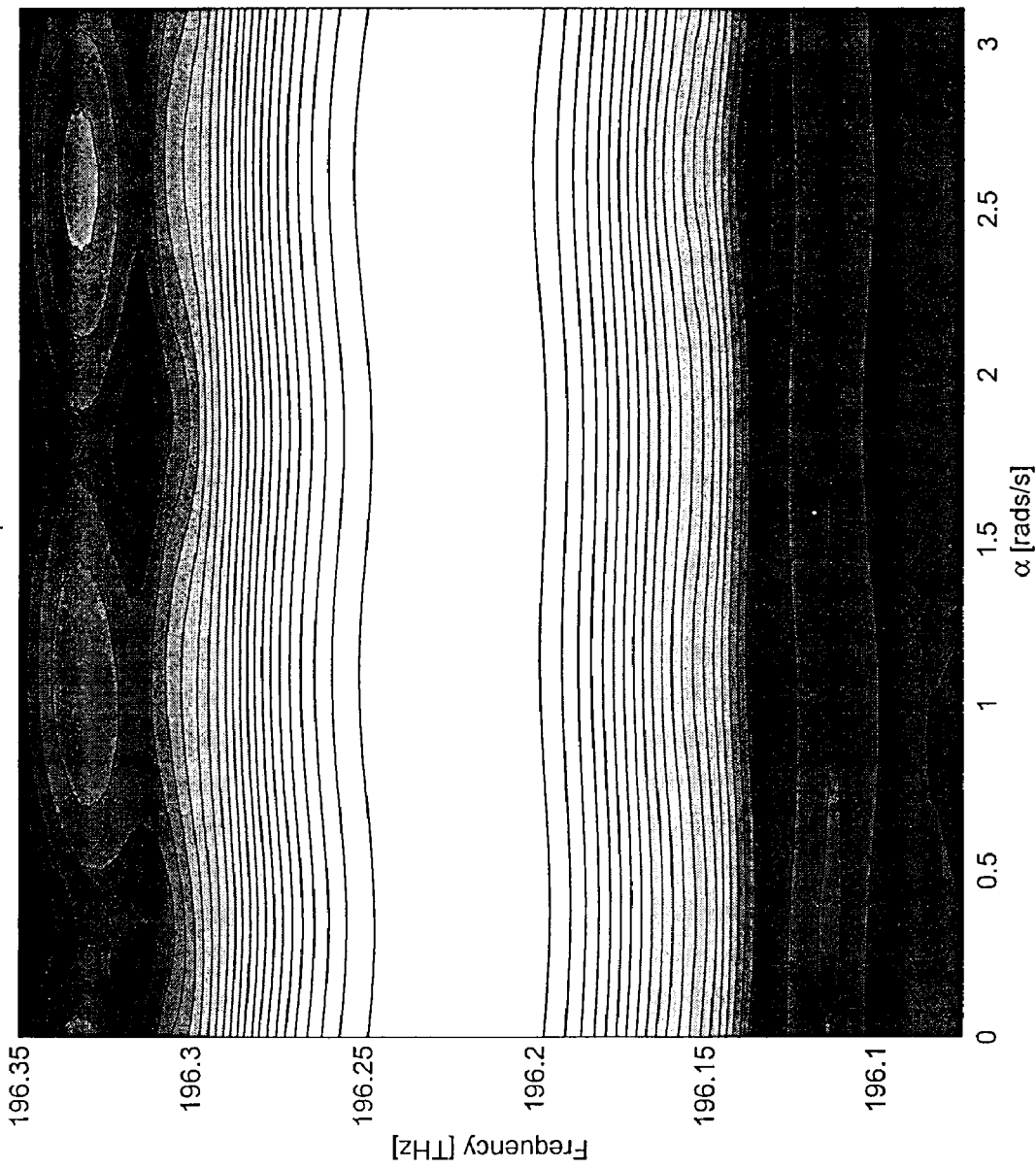
FIGS. 6a to 6d are diagrams illustrating various views of insertion loss versus frequency and angle α for a polarization compensated DUT.
Figure 6B:
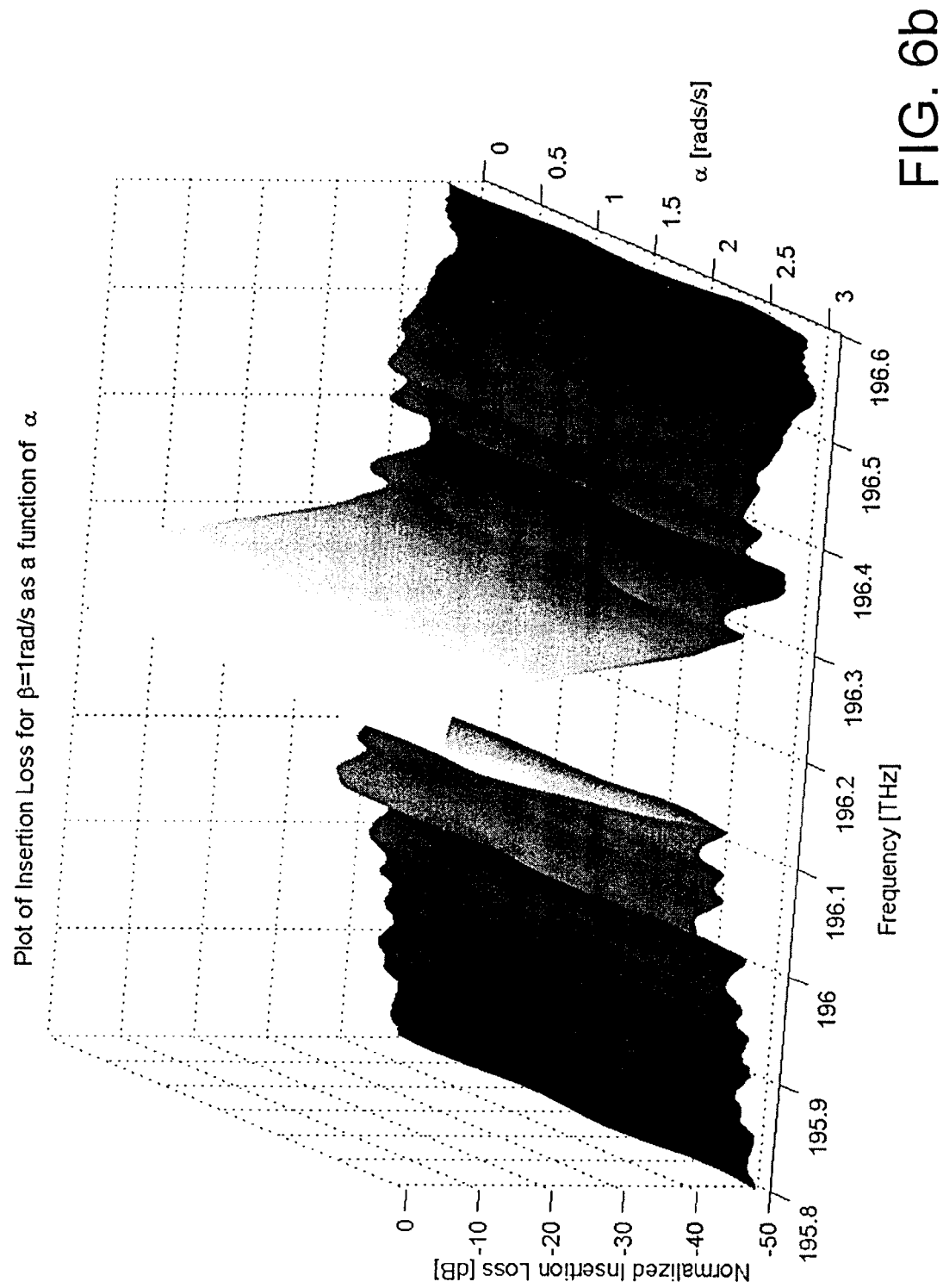
Figure 6C:
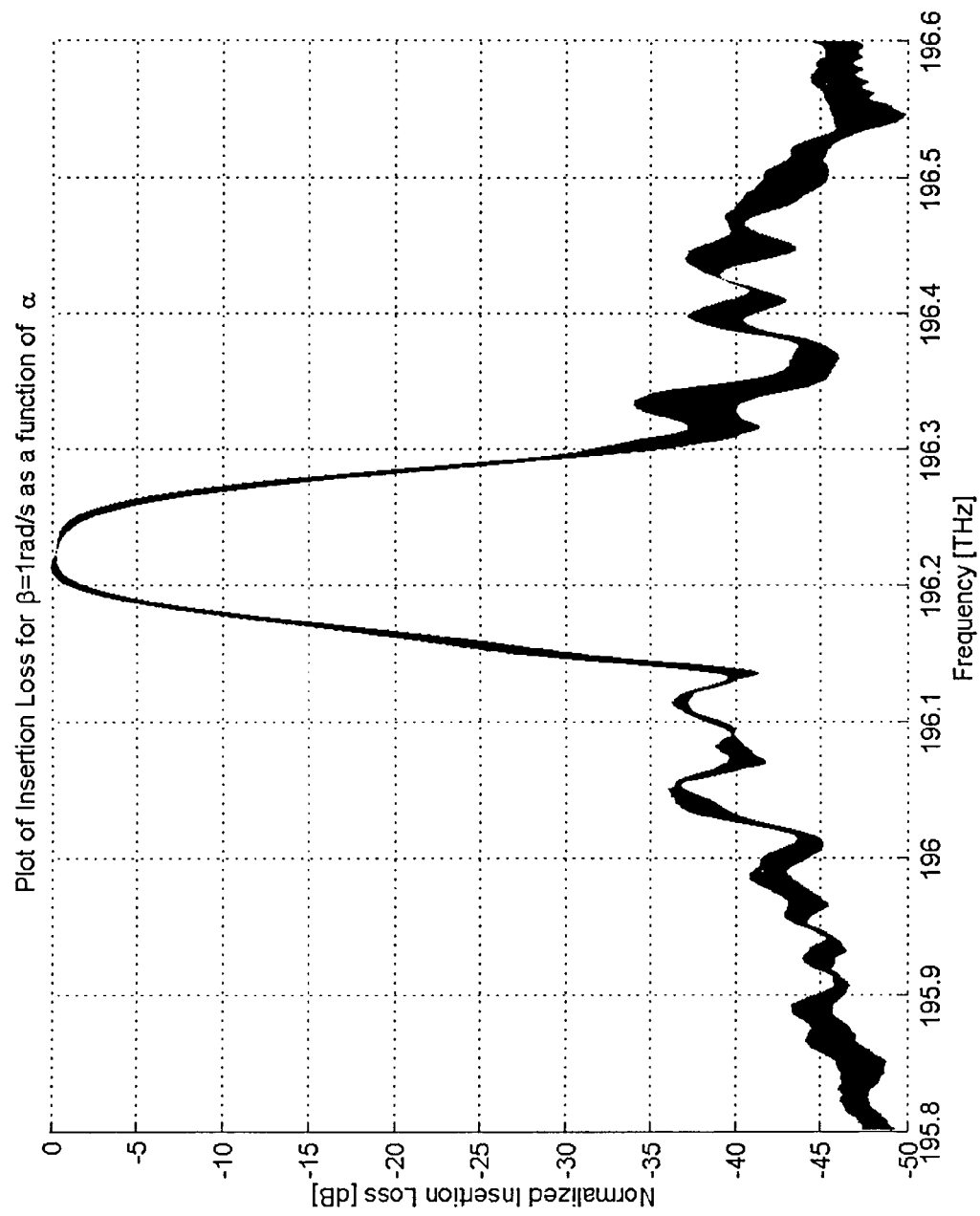
Figure 6D:
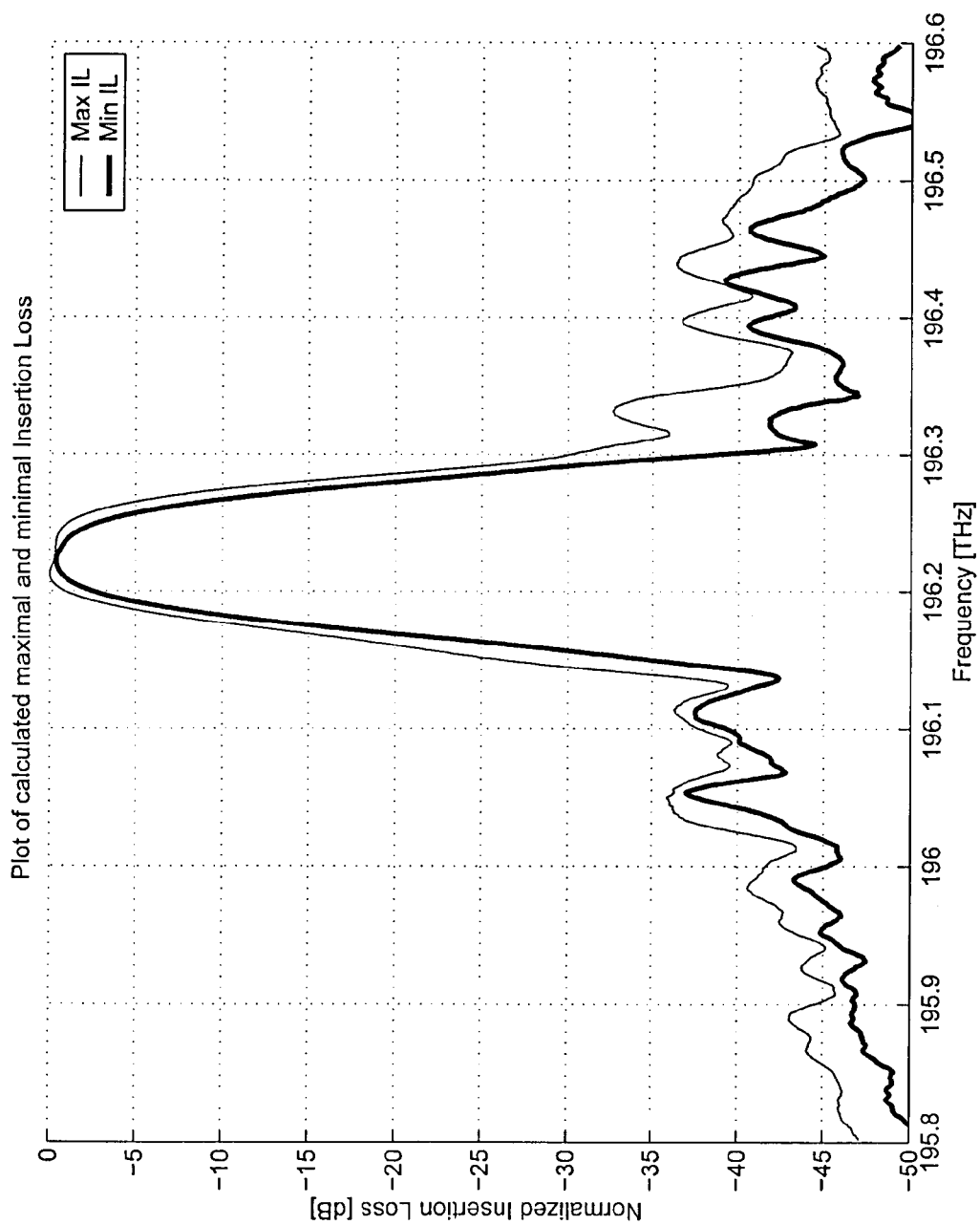

FIG. 4 illustrates a path of sampling points on the surface of the Poincaré sphere by varying $\alpha$ from 0 to $\pi$ rad/s while keeping $\beta=1$ rad/s, which corresponds to a rotation of the quarter-wave-plate while the half-wave-plate is kept in a fixed orientation. FIGS. 5a to 5d show transmission spectra of a polarization-uncompensated DUT using different projections, indicating large variation in the transmission spectra as a function of the angle $\alpha$. The large variation in insertion loss and center frequency as a function of varying incident SoPs—angle $\alpha$—is obvious since no polarization compensator is present to minimize the polarization dependence of the transmission spectrum for different incident SoPs. FIGS. 5c and 5d show matched results between a side view of the simulated transmission spectrum, shown in FIGS. 5a and 5b, and the calculated $T_{0_{MAX}}(\lambda)$ and $T_{0_{MIN}}(\lambda)$ spectra, shown in FIG. 2a, indicating that the simulated spectra are within the limits of the extremes of insertion loss in FIG. 2a. Corresponding to the FIGS. 5a to 5d, FIGS. 6a to 6d show transmission spectra of a polarization-compensated DUT. As expected, the variation in the center frequency and insertion loss as a function of varying incident SoP, is substantially less due to the presence of the polarization compensator.

Figure 7A:
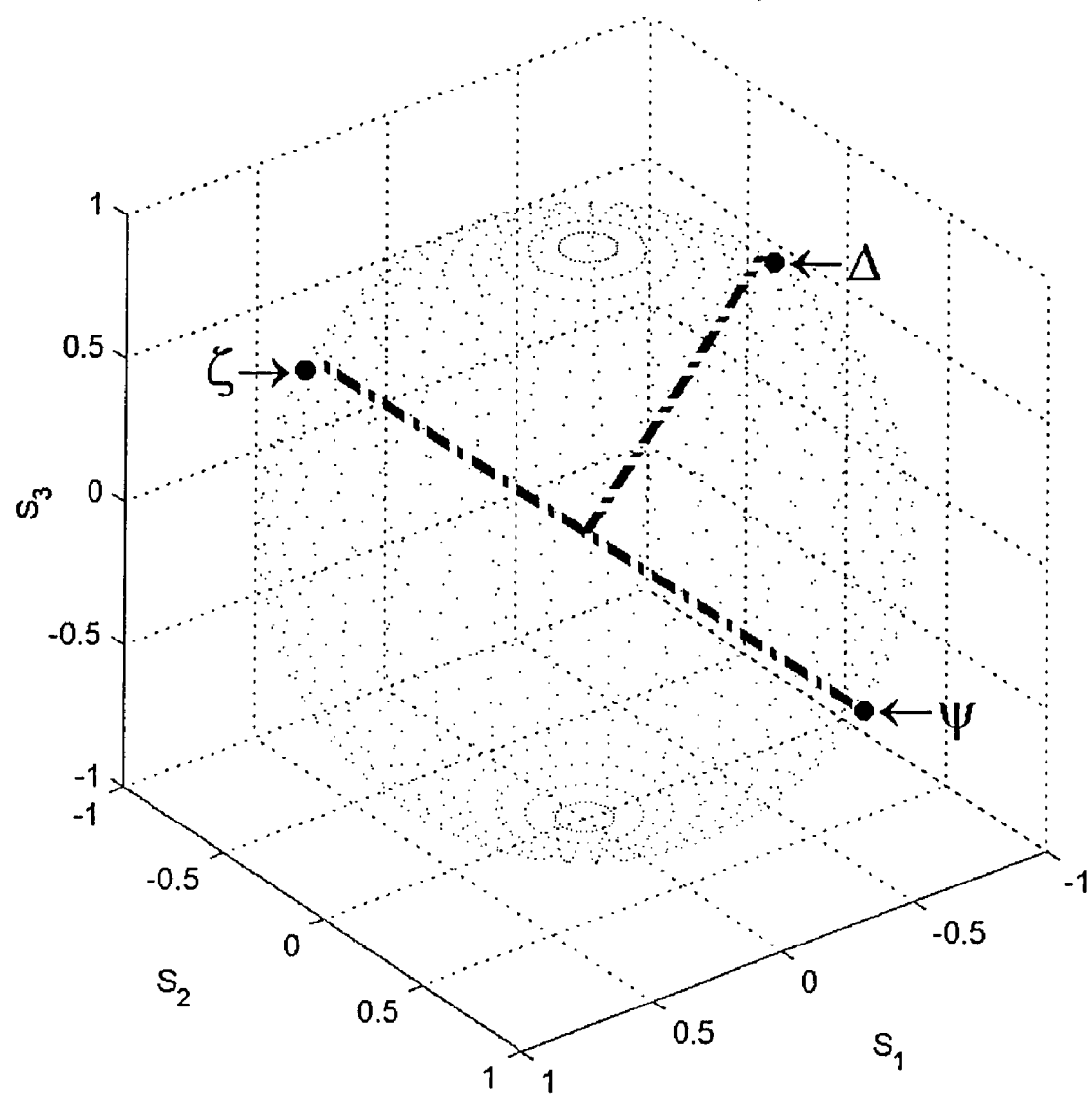
FIGS. 7a and 7b are diagrams illustrating extreme orthogonal SoPs on the surface of the Poincaré sphere and corresponding spectra polarization uncompensated DUT.
Figure 7B:
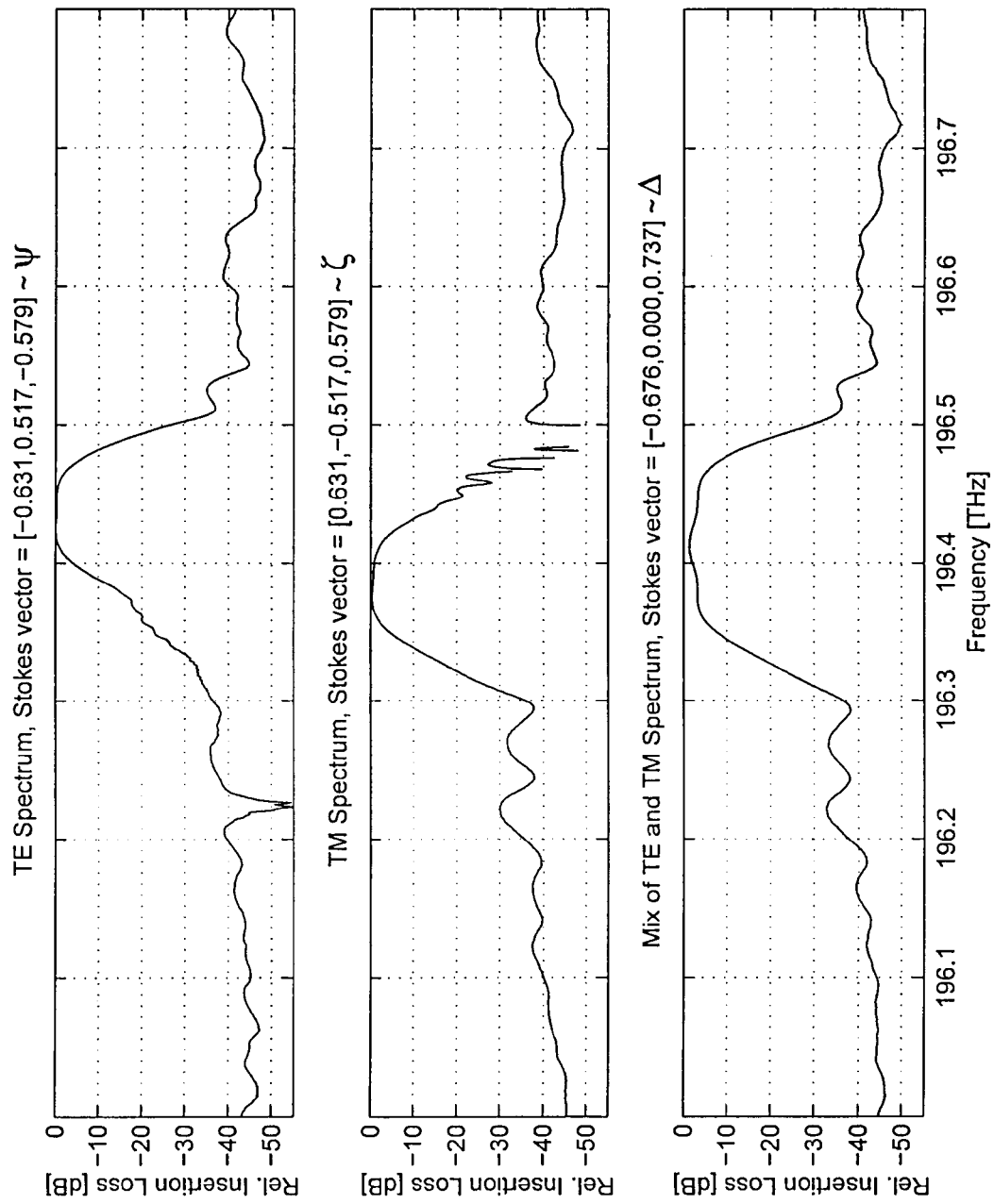
Figure 8A:
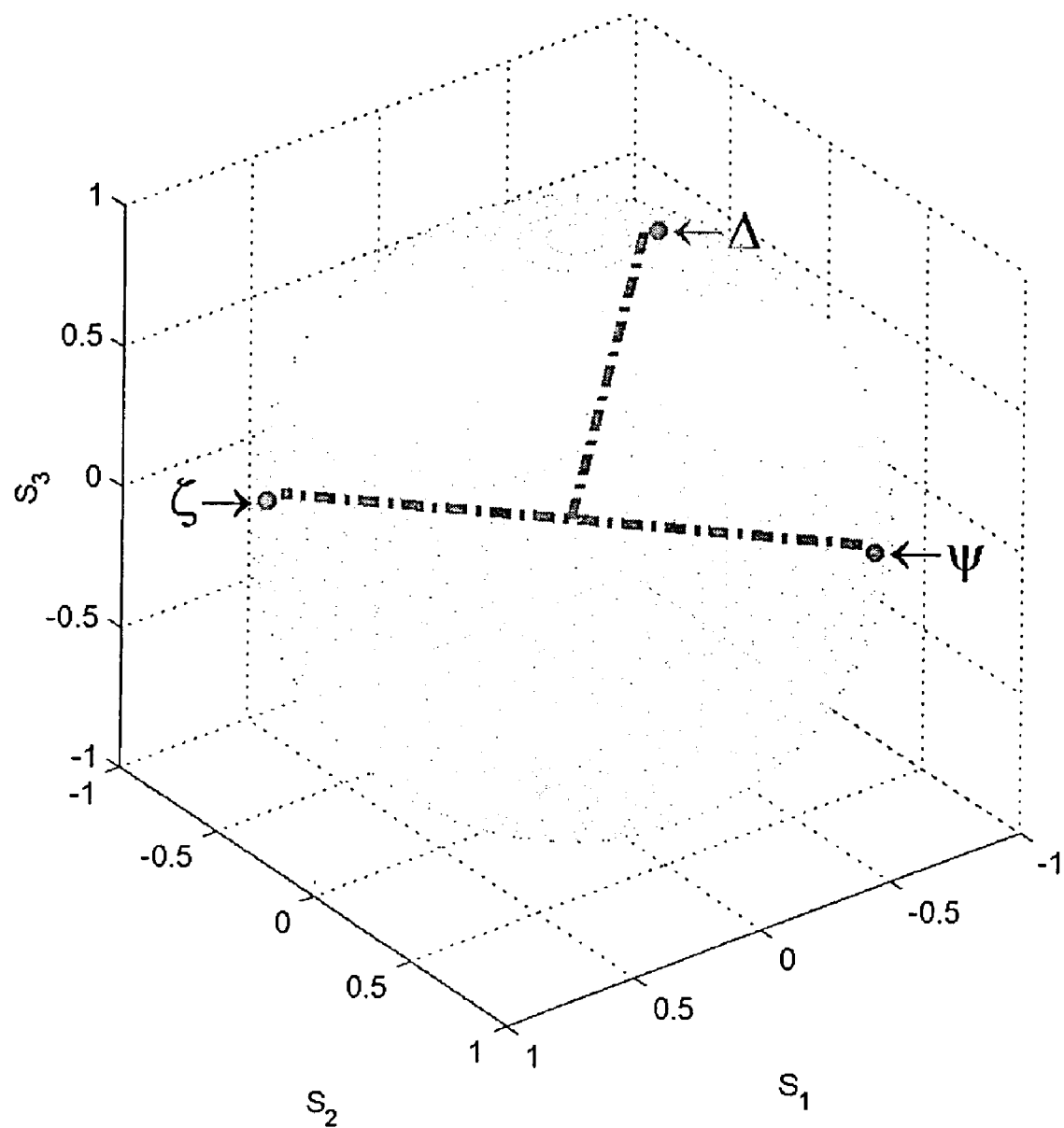
FIGS. 8a and 8b are diagrams illustrating extreme orthogonal SoPs on the surface of the Poincaré sphere and corresponding spectra polarization compensated DUT.
Figure 8B:
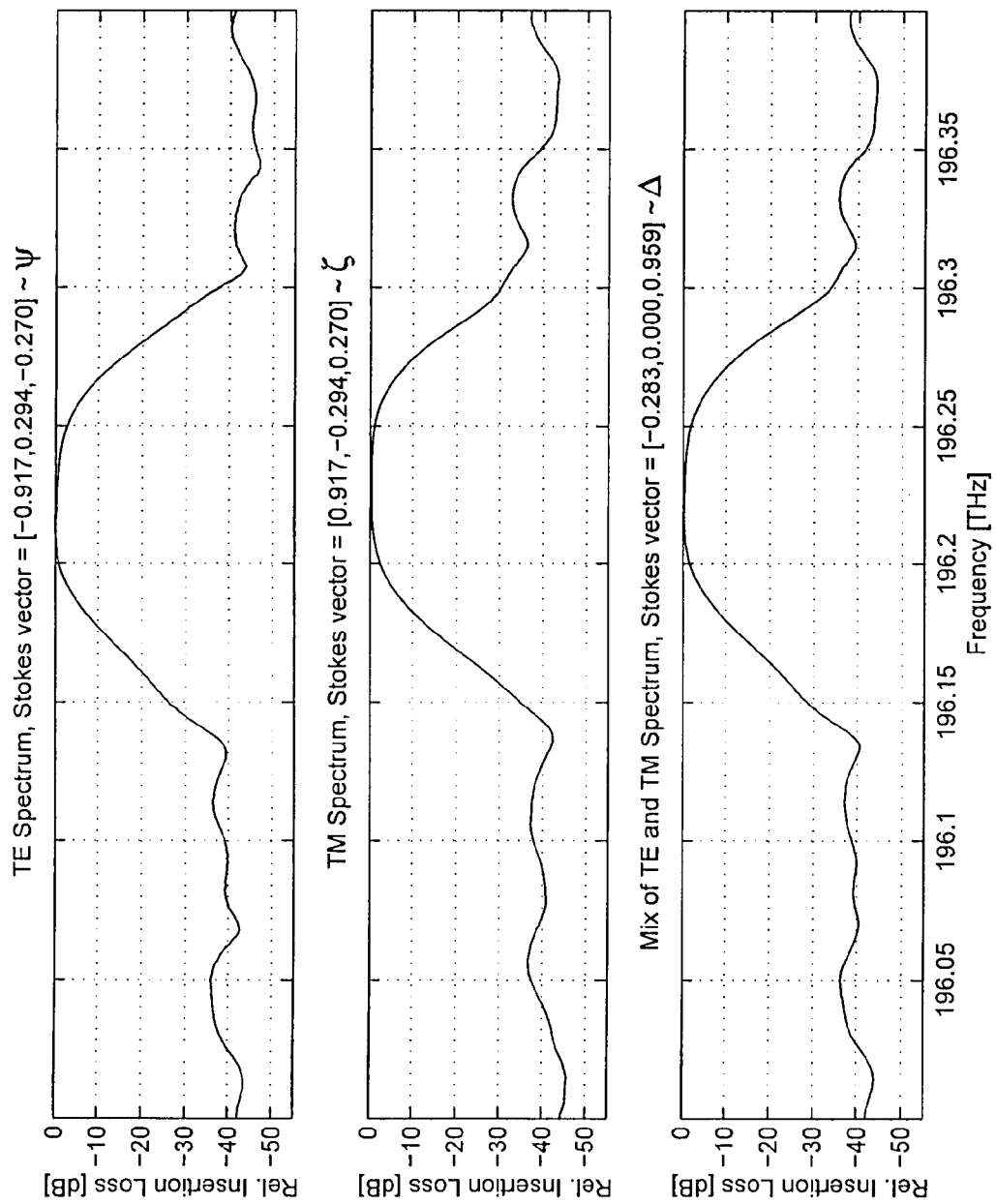

Using the SoP simulation, it is possible to evaluate a DUT's performance for various fully polarized incident SoPs on the Poincaré sphere by simply varying the values of the angles $\alpha$ and $\beta$. By performing SoP simulation substantially covering the complete surface of the Poincaré sphere it is then possible to extract extreme SoPs approximately corresponding to TE and TM incident SoPs, as shown in FIGS. 7a and 7b for a polarization-uncompensated DUT, and in FIGS. 8a and 8b for a polarization-compensated DUT. For example, for each pair of values of the angles $\alpha$ and $\beta$ the center frequency $f_c$ is determined from the corresponding simulated spectrum. From these data the maximum and minimum values of the center frequency $f_c$ and their corresponding angles $\alpha$ and $\beta$ are then determined. Using the corresponding Stokes vectors SoP$_1$ and SoP$_2$, the spectra covering the complete operating wavelength range are then simulated providing a SoP$_1$ spectrum and a SoP$_2$ spectrum, respectively. Subtraction of the extreme values of the center frequency $f_c$ yields the absolute value of the Polarization Dependent frequency (PDf).

Figure 9:
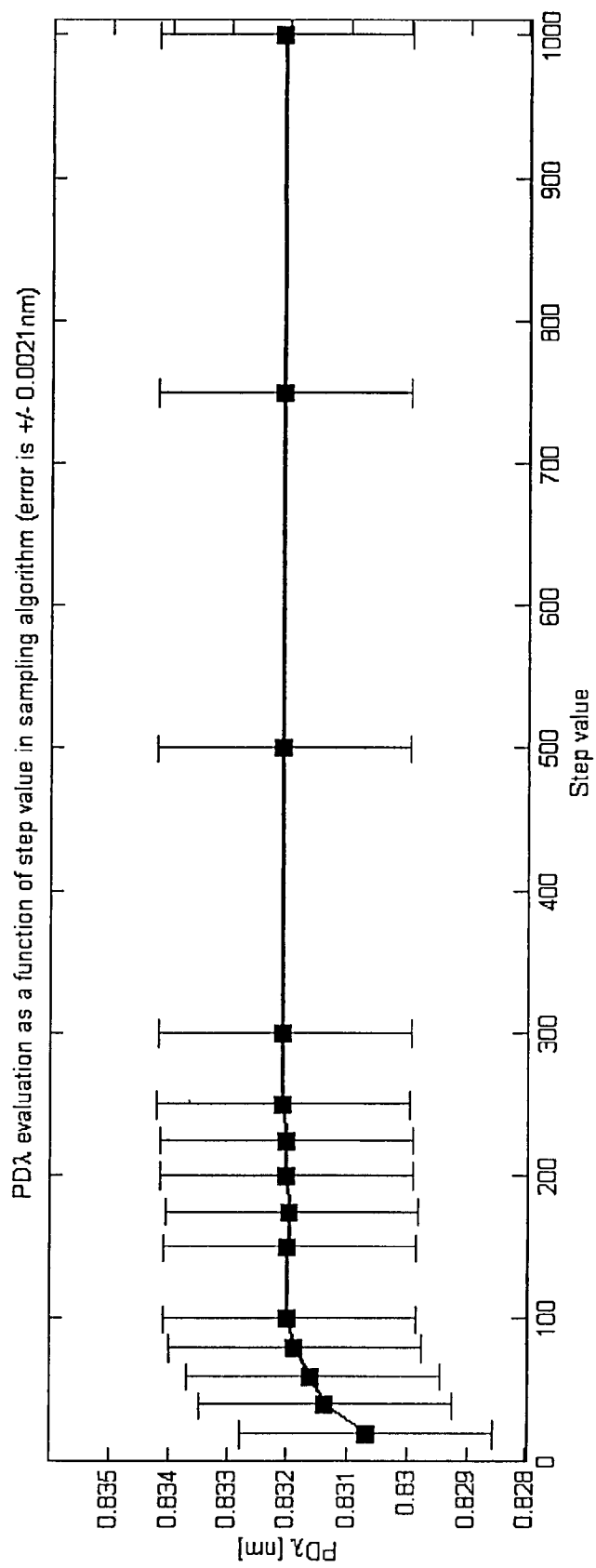
FIG. 9 is a diagram illustrating convergence of PDλ /PDf results with increased sampling density.

As is evident, choice of the step size of the values of the angles $\alpha$ and $\beta$ for the SoP simulation has a direct impact on the time needed to perform the SoP simulation substantially covering the complete surface of the Poincaré sphere and to determine the PDf—or a Polarization Dependent Wavelength PD $\lambda$. As shown in FIG. 9, step values above 300 yield no significant variation in PD $\lambda$. This is equivalent to sampling approximately 22,000 incident SoPs.

Figure 10:
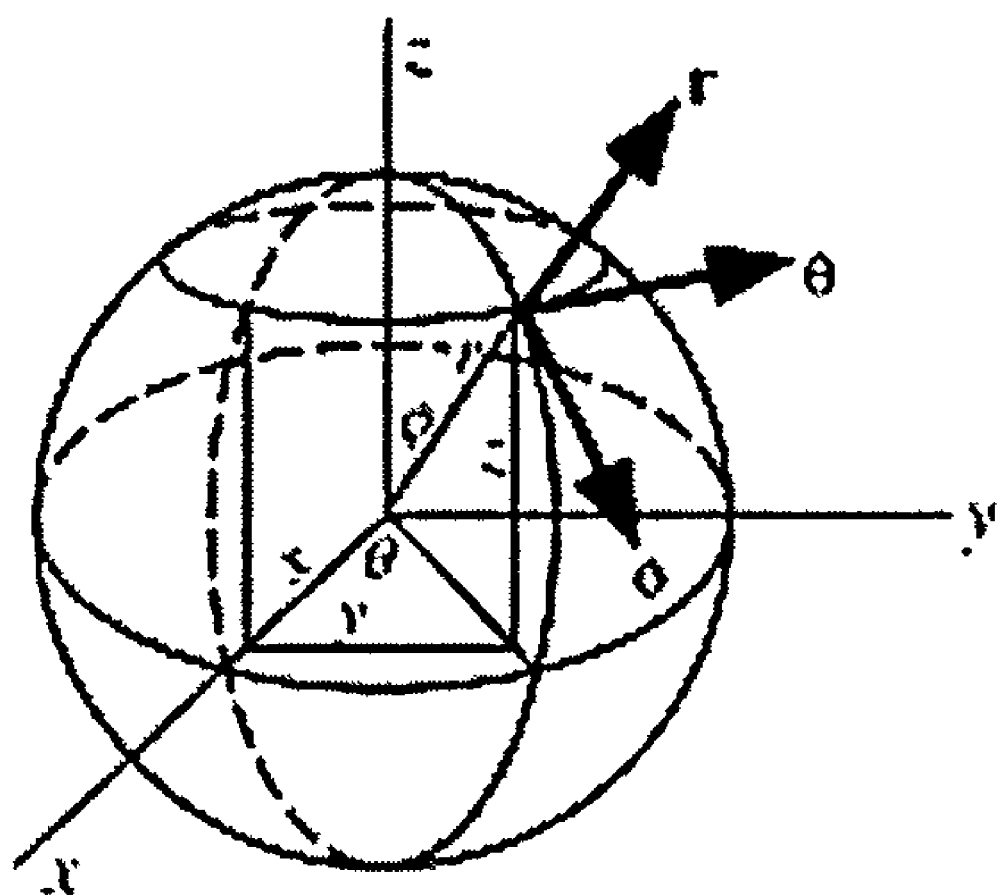
FIG. 10 is a diagram illustrating conversion of Stokes vectors to spherical coordinates.

In order to ease the visualization of variations of the parameters investigated, a topographic or Mercator projection is used to project the surface of the Poincaré sphere onto a 2D plane. It is noted, that the projection creates some unavoidable distortions but it has been found that these distortions have only a minor impact and do not outweigh the advantages for evaluating the simulation results. The 3D sampling based on pairs of values for the angles $\alpha$ and $\beta$ as well as the corresponding Stokes vectors are projected onto the 2D plane based on spherical coordinates using angles $\phi$ and $\theta$, as shown in FIG. 10. The Stokes vector components $S_1$, $S_2$, and $S_3$ are converted to the angles $\phi$ and $\theta$ as follows:

$$S_1 = \cos(\theta)\sin(\phi)$$

$$S_2 = \sin(\theta)\sin(\phi)$$

$$S_3 = \cos(\phi) \quad (12)$$

Figure 11A:
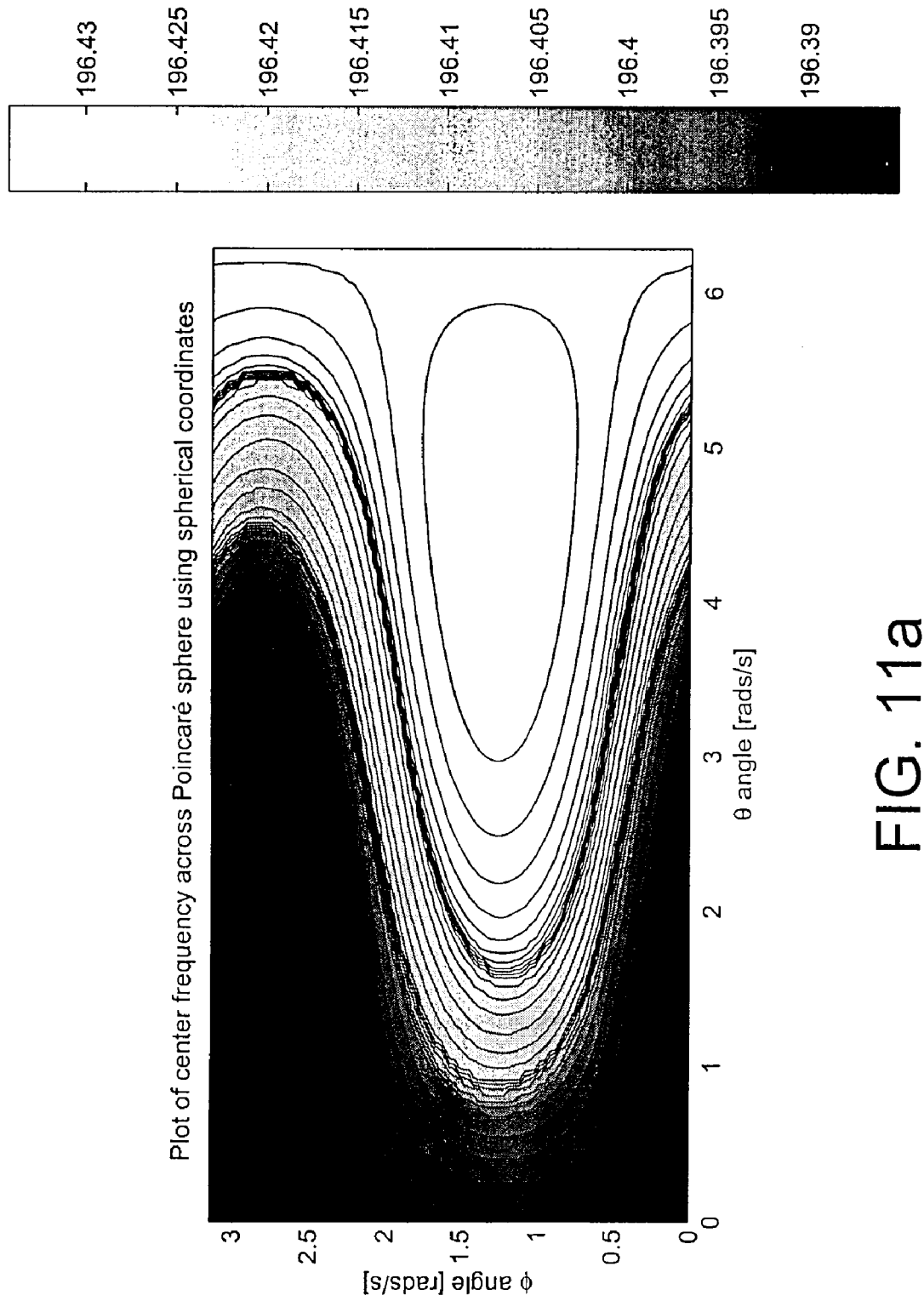
FIGS. 11a and 11b are diagrams illustrating a Mercator projection of center frequency and insertion loss, respectively, for a polarization uncompensated DUT.
Figure 11B:
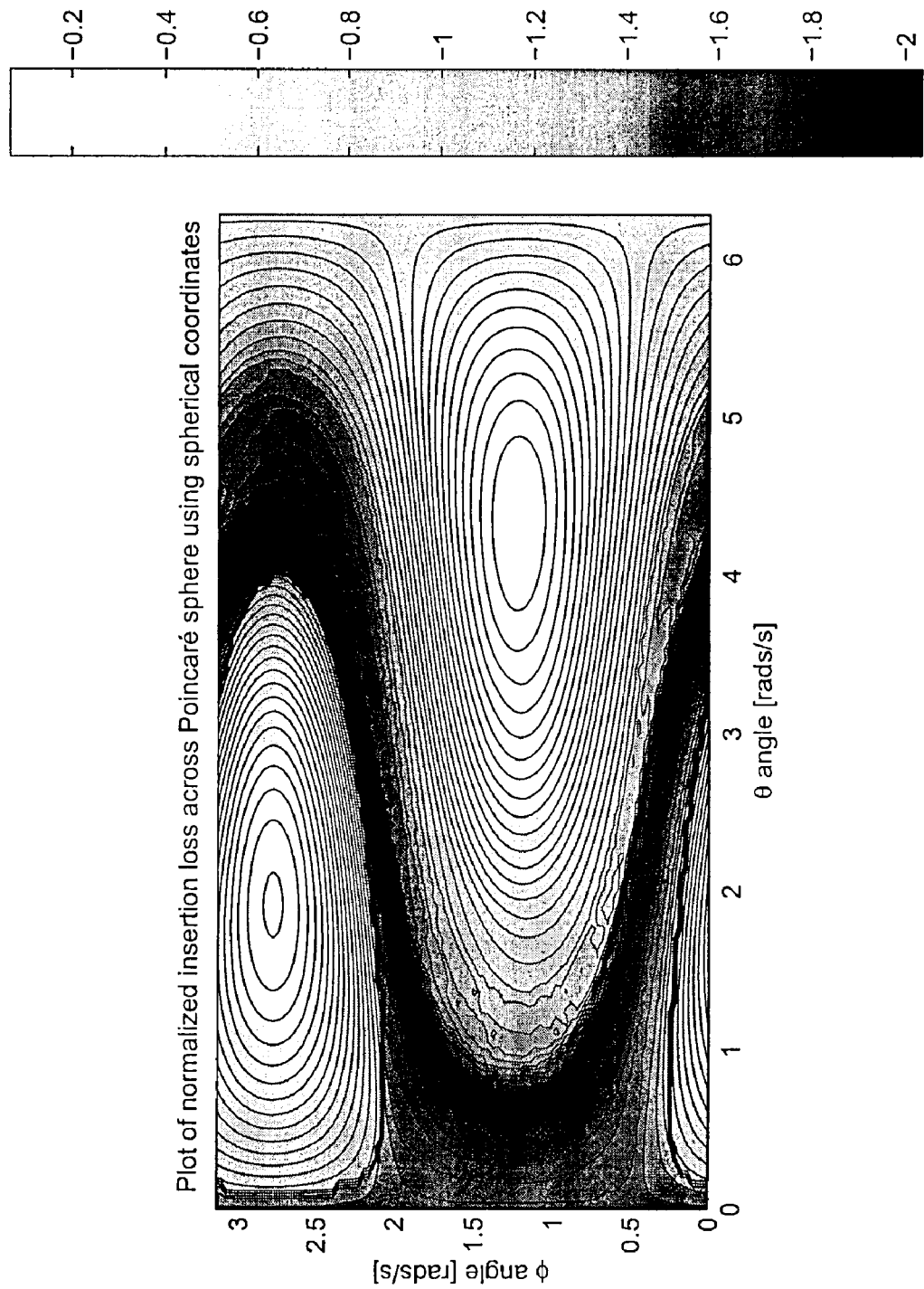

Sampling is then performed between 0 and $2\pi$ for $\theta$—along equator—and between 0 and $\pi$ for $\phi$—from north pole to south pole. FIGS. 11a and 11b show the projection of the center frequency and insertion loss, respectively, for a polarization-uncompensated DUT covering the Poincaré sphere surface in a 2D plane with the x-axis and y-axis representing $\theta$ and $\phi$, respectively. The center frequency projection, FIG. 11a, shows a global maximum and minimum corresponding to the largest and smallest extracted center frequencies. These are approximately orthogonal since they are located on opposite sides of the Poincaré sphere. They are approximately spaced by $$\frac{\pi}{2}$$

rads/s along the $\phi$-axis—north and south hemisphere—and by approximately $\pi$ rads/s along the $\theta$-axis—east and west direction. This DUT, having no polarization compensator, is expected to have clearly defined extremes of center frequency. Hence it is possible to use this criterion to find an approximate match to TE and TM incident SoPs, i.e. SoP$_1$ and SoP$_2$. Also noticeable is an S-shaped plateau surrounding the global maximum and minimum. The S-shaped plateau corresponds to the circumference of the Poincaré sphere matching an equal mix of TE and TM incident SoP. Further, the plateau corresponds to a new equator defined by poles located at the global maximum and minimum.

However, in some cases the extremes of insertion loss do not sufficiently correlate with the global maxima and minima of the center frequency, as shown in FIGS. 11a and 11b. The same yields for the extremes of the center frequency for different DUTs, such as well polarization compensated DUTs. To optimize the selection of a SoP$_1$ and SoP$_2$ spectrum both criterions-extremes of insertion loss, and global maximum and minimum of the center frequency—have been combined, together with a new orthogonality parameter for determining the orthogonality of the angles α and β found for each criterion, providing a first embodiment of a method for determining a polarization dependent characteristic of a device according to the invention. The angles α and β yielding extremes of center frequency and extremes of insertion loss are both converted to Stokes vectors and the orthogonality parameter for each criterion is determined. TE and TM incident Stokes vectors have the electrical field of their TEM waves oriented at 90 degrees from each other. On the Poincaré sphere this corresponds to having Stokes vectors pointing in opposite directions, i.e. the dot product of the two Stokes vectors is equal to −1:

$$\vec{S}_{TE} \cdot \vec{S}_{TM} = -1 \quad (13)$$

Equation (13) is expanded as follows:

$$\vec{S}_{TE} \cdot \vec{S}_{TM} = S_{1_{TE}} S_{1_{TM}} + S_{2_{TE}} S_{2_{TM}} + S_{3_{TE}} S_{3_{TM}} = -1 \quad (14)$$

Assuming $\vec{S}_{TE} = -\vec{S}_{TM}$—indicating opposite Stokes vectors on the Poincaré sphere—equation (14) becomes valid for opposite points on the surface of the Poincaré sphere:

$$\vec{S}_{TE} \cdot \vec{S}_{TM} = -S_{1_{TE}} S_{1_{TE}} - S_{2_{TE}} S_{2_{TE}} - S_{3_{TE}} S_{3_{TE}} \quad (1)$$
$$= -(S_{1_{TE}}^2 + S_{2_{TE}}^2 + S_{3_{TE}}^2)$$
$$= -1$$

Equation (14) provides a numerical comparison of the two criteria used. After simulation and analysis of all spectra covering substantially the complete surface of the Poincaré sphere, calculation of the orthogonality factor allows the selection of the best suited criterion, i.e. the criterion with its orthogonality factor closest to −1. The angles α and β corresponding to the best suited criterion is then used to simulate the $SoP_1$ and $SoP_2$ spectrum.

Figure 12:
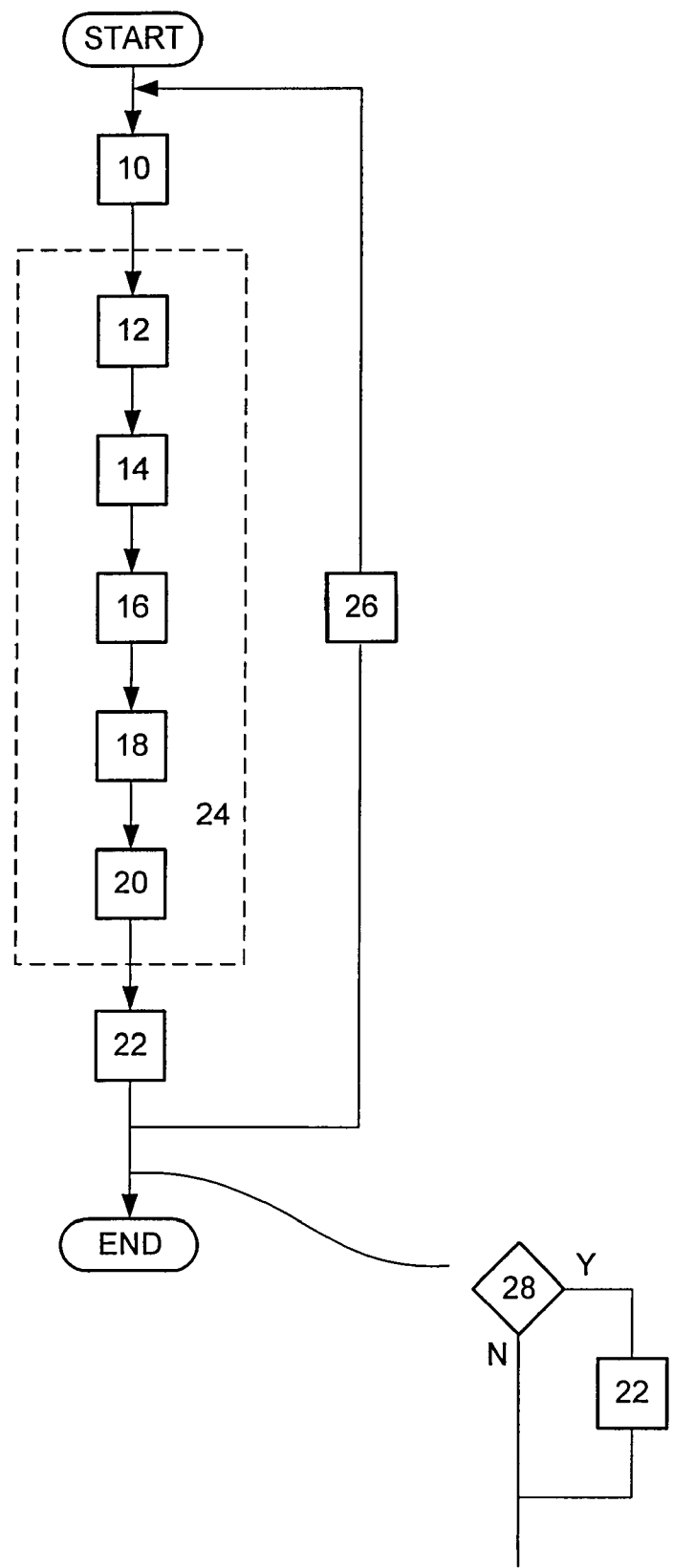
FIG. 12 is a simplified flow diagram of a first embodiment of a method for determining a polarization dependent characteristic of a device according to the invention.

Referring to FIG. 12, a simplified flow diagram of the first embodiment of a method for determining a polarization dependent characteristic of a device is shown. Mueller matrix data indicative of wavelength dependent first row Mueller matrix elements of an optical or opto-electronic device are received—box 10. Using the Mueller matrix data, a set of insertion loss data and a set of center frequency data is determined for each of a plurality of input states of polarization substantially covering a surface of a Poincaré sphere—box 12. The set of insertion loss data and the set of center frequency data are then processed for determining extremes of insertion loss and extremes of center frequency—box 14. For each of the extremes of the insertion loss and the extremes of the center frequency a first and a second incident Stokes vector is determined—box 16. The orthogonality parameter for the first and the second incident Stokes vector for each of the extremes of the insertion loss and the extremes of the center frequency is then determined—box 18. Then the extreme and the corresponding first and second incident Stokes vector associated with the orthogonality parameter closest to −1 is selected—box 20. Finally the data indicative of the polarization dependent characteristic of the device are determined using the selected first and second incident Stokes vector and the Mueller matrix data—box 22. Box 24 indicates processing steps which are performed using a predetermined wavelength range, which is smaller than an operational wavelength range of the device in order to reduce the number of computations and, therefore, processing time. In case of a multi-channel device this process is repeated for each of the channels—box 26. Optionally, an additional analysis step is added to swap the first and the second incident Stokes vectors—box 29—if the dot product of adjacent channels first incident Stokes vectors is found to be negative—box 28, i.e. if their first incident Stokes vectors are found to point in opposite directions. This is the case when the first incident Stokes vectors are close to the equator of the Poincaré sphere and adjacent channels have $S_3$ terms close to 0.

However, in most situations pairs of first and second Stokes vectors obtained using these two criteria do not have a dot product of exactly −1, indicating that both criteria are not ideal. Since the resulting incident Stokes vectors are not exactly opposite to each other, there is no guarantee that these Stokes vectors represent sufficiently close TE and TM incident SoPs.

Figure 13:
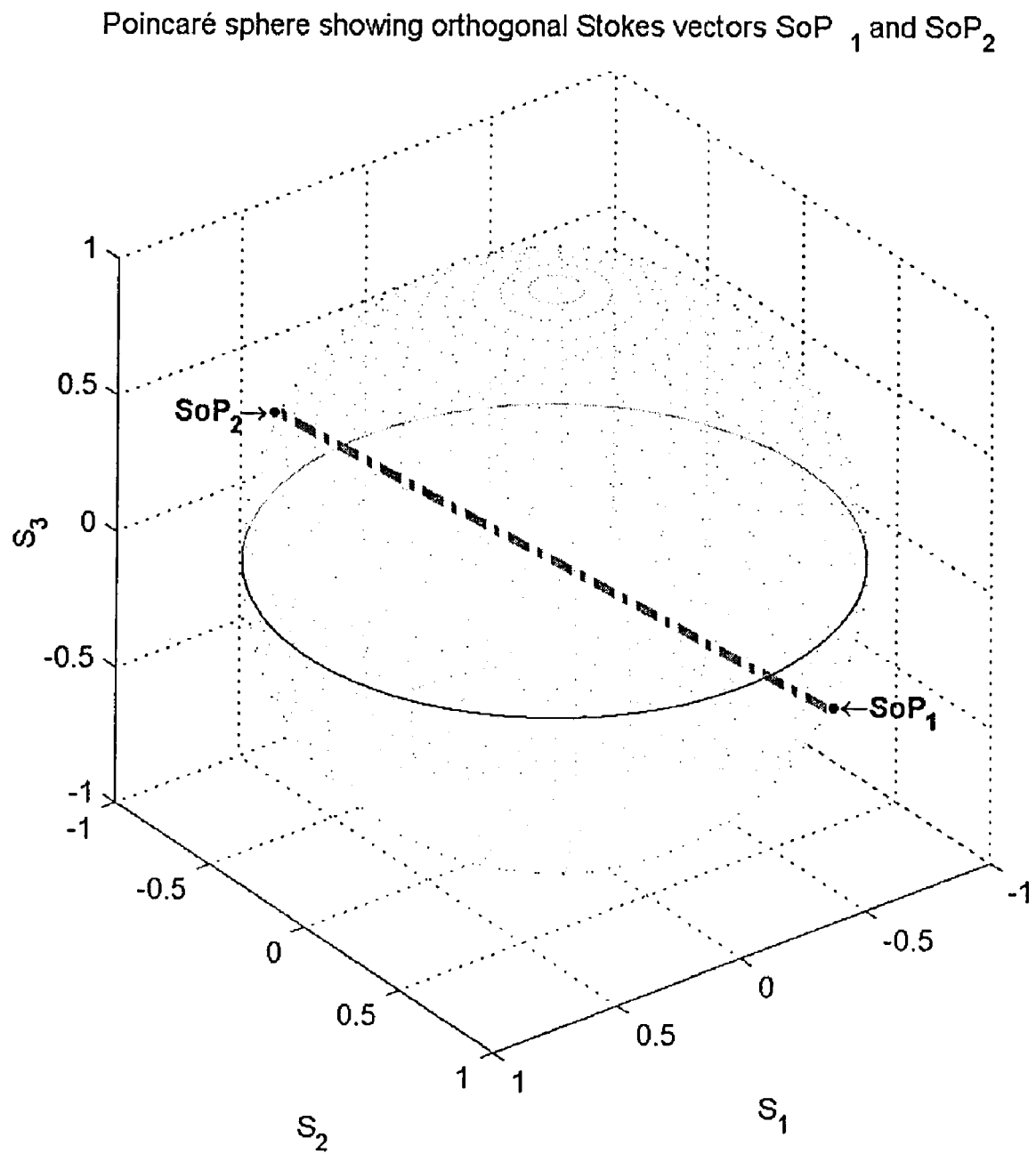
FIG. 13 is a diagram illustrating opposite Stokes vectors on the surface of the Poincaré sphere.

This problem is overcome in the second embodiment of a method for determining a polarization dependent characteristic of a device according to the invention. By sampling half of the surface of the Poincaré sphere and comparing opposite Stokes vector $SoP_1$ and $SoP_2$ a new analysis and selection criterion is applied. By definition, a Stokes vector $SoP_2$ representing a second SoP orthogonal to a first SoP represented by a Stokes vector $SoP_1$ is located opposite the Stokes vector $SoP_1$ on the surface of the Poincaré sphere, as shown in FIG. 13:

$$\vec{SoP_1} = -\vec{SoP_2}$$
$$[S_1 \, S_2 \, S_3]^T = -[S_1 \, S_2 \, S_3]^T \quad (16).$$

To avoid performance parameters a technique is applied to assign a numerical value for quantifying a difference between pairs of orthogonal SoPs. This is comparable to finding a base set of opposite vectors representing a pair of orthogonal SoPs from which all other SoPs are derived as linear combinations. A normalized difference equation is then used to compare different pairs of opposite incident Stokes vectors $SoP_1$ and $SoP_2$. By using the following equations the difference between the transmission spectra corresponding to $SoP_1$ and $SoP_2$, respectively is expressed in a single numerical value. Let $f_1(\lambda)$ be the resulting transmission spectrum for the incident Stokes vector $SoP_1$, and $f_2(\lambda)$ for $SoP_2$, defined as follows:

$$f_1(\lambda) = m_{00}(\lambda) S_0 + (m_{01}(\lambda) S_1 + m_{02}(\lambda) S_2 + m_{03}(\lambda) S_3)$$
$$f_2(\lambda) = m_{00}(\lambda) S_0 - (m_{01}(\lambda) S_1 + m_{02}(\lambda) S_2 + m_{03}(\lambda) S_3) \quad (17)$$

The variables $f_1(\lambda)$ and $f_2(\lambda)$ are then used in the sampling process over angles α and β. For each pair of angles α and β a numerical value ξ, corresponding to a normalized difference between the $f_1(\lambda)$ and $f_2(\lambda)$ functions, is defined as follows:

$$\xi(\alpha, \beta) = 1 - \frac{\sum_\lambda (f_{1_{(\alpha,\beta)}}(\lambda) - f_{2_{(\alpha,\beta)}}(\lambda))^2}{\sqrt{\sum_\lambda (f_{1_{(\alpha,\beta)}}^2(\lambda) f_{2_{(\alpha,\beta)}}^2(\lambda))}} \quad (18)$$

The determination of the value ξ is performed, for example, by limiting the α angle between 0 and 90 degrees, thus ensuring a negative $S_3$ term. Hence, $SoP_1$ is located on the southern hemisphere of the Poincaré sphere, since from equation (10) $S_3(\alpha) = -\sin(2\alpha)$. Alternatively, for angles α between 90 and 180 degrees $SoP_1$ is located on the northern hemisphere of the Poincaré sphere.

For equation (18) the following observations are made:

the larger the difference between the $f_1(\lambda)$ and the $f_2(\lambda)$ spectrum across a predetermined wavelength range, the smaller the value of $\xi$; and, if the $f_1(\lambda)$ and the $f_2(\lambda)$ spectrum are identical then the value of $\xi$ is equal to 1, which is, for example, the case for an equal mix of TE and TM modes.

By tracking which pair of $\alpha$ and $\beta$ angles yields the smallest value of $\xi$—corresponding to two extreme orthogonal incident SoPs—the $SoP_1$ and $SoP_2$ Stokes vector pair is determined and used to simulate the two resulting spectra for the complete operational wavelength range. As is evident, polarization dependent parameters such as PDf and PDL are easily determined from the two resulting spectra.

Figure 14:
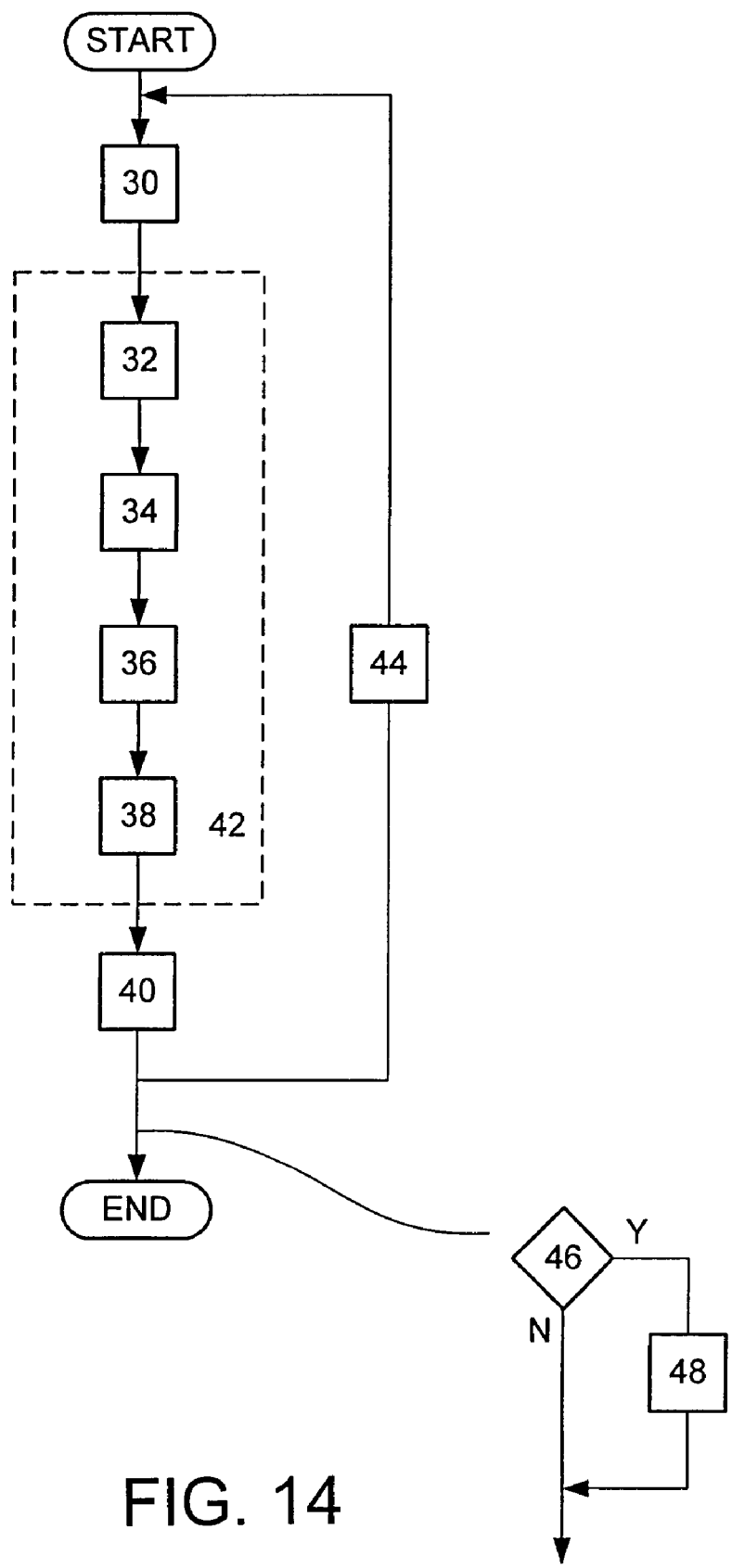
FIG. 14 is a simplified flow diagram of a second embodiment of a method for determining a polarization dependent characteristic of a device according to the invention.

Referring to FIG. 14, a simplified flow diagram of the second embodiment of a method for determining a polarization dependent characteristic of a device is shown. Mueller matrix data indicative of wavelength dependent first row Mueller matrix elements of an optical or opto-electronic device are received—box 30. Referring to box 32, a set of first Stokes vectors and a set of second Stokes vectors is determined. Each Stokes vector of the set of second Stokes vectors is opposite to a corresponding Stokes vector of the set of first Stokes vectors. The set of first Stokes vectors is determined such that substantially the surface of a hemisphere of the Poincaré sphere is covered. Using the Mueller matrix data, a first and second transmission spectrum is determined for the first Stokes vector and the second Stokes vector of each pair of opposite first and second Stokes vectors—box 34. This step is followed by the determination of a normalized difference between the first and second transmission spectrum for each pair of opposite first and second Stokes vectors—box 36. Then the pair of opposite first and second Stokes vectors having the largest normalized difference is determined—box 38—and, finally, the data indicative of the polarization dependent characteristic of the device are determined using the selected first and second incident Stokes vector and the Mueller matrix data—box 40. Box 42 indicates processing steps which are performed using a predetermined wavelength range, which is smaller than an operational wavelength range of the device in order to reduce the number of computations and, therefore, processing time. In case of a multi-channel device this process is repeated for each of the channels—box 44. Optionally, the first and the second incident Stokes vectors are swapped—box 48—if the dot product of the incident Stokes vectors of adjacent channels is found to be negative—box 46.

Figure 15:
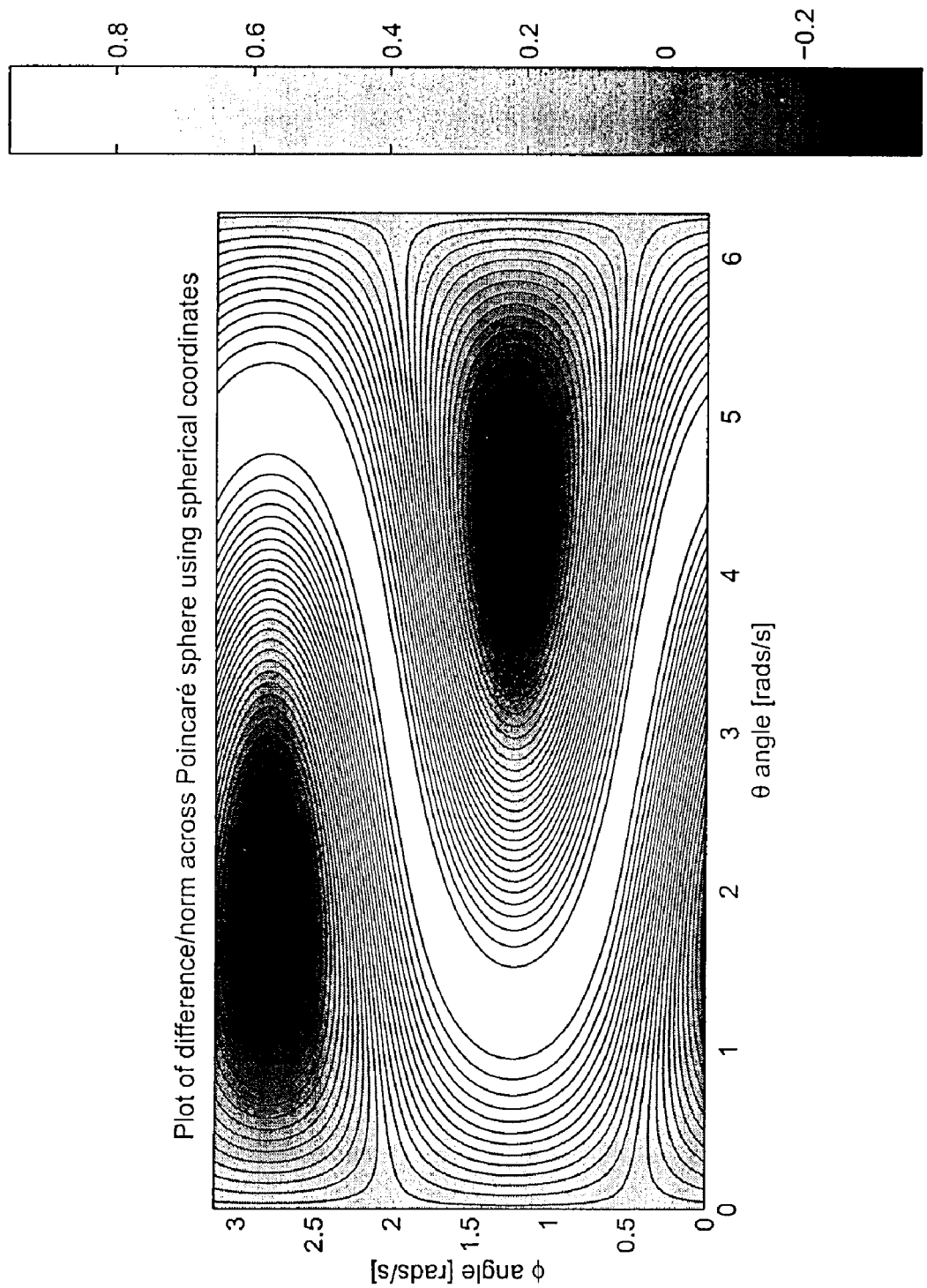
FIG. 15 is a diagram illustrating a Mercator projection of normalized difference for a polarization uncompensated DUT.

FIG. 15 shows a Mercator projection of the normalized difference parameter for the DUT shown in FIGS. 11a and 11b. Since only half the sphere is simulated the result has been mirrored to ease comparison with FIGS. 11a and 11b. As in FIG. 11a, the same S-shaped plateau is noticed. This plateau reaches a value of $\xi=1$, which corresponds to an equal mix of TE and TM modes. The newly defined poles corresponding to the symmetric global maxima define a new equator which corresponds to the S-shaped plateau. The global minima correspond to the extremes of the center frequency Mercator projection, FIG. 11a, as well as to the global maxima of the insertion loss, FIG. 11b. The minima of the insertion loss match the equal mix of TE and TM modes of the S-shaped plateau. The smoothness of the variation of $\xi$ as a function of varying incident SoPs increases the confidence in the validity of linear combinations using the two extreme orthogonal SoPs as a base set for appropriately recreating incident Stokes vectors.

The second embodiment of a method for determining a polarization dependent characteristic of a device according to the invention has numerous advantages. Since the $SoP_1$ and $SoP_2$ incident Stokes vectors are—by definition—opposite, a single solution is obtained obviating the step of determining the solution having a pair of Stokes vectors having a dot product closest to −1. Furthermore, since only points covering half of the surface of the Poincaré sphere are sampled, the computational effort for performing the simulation process is reduced.

After simulation of all channels is completed, it is possible to assign one of the $SoP_1$ and $SoP_2$ incident Stokes vectors to the TM mode. For example, a polarization compensator is designed to affect the incident TM mode center frequencies more than the incident TE mode center frequencies. Hence, by looking at the center frequencies of all channels after simulation, the $SoP_1$ state showing the largest fluctuations across the operating wavelength range, or equivalently the largest slope of PDf when plotted as a function of channel number, is assigned to the TM mode. Preferably, this additional analysis step is only used when non-absolute PDf results are needed.

In a third, preferred, embodiment of a method for determining a polarization dependent characteristic of a device according to the invention the complete operating wavelength spectrum is considered. Instead of determining extremes for individual wavelengths, extreme opposite $SoP_1$ and $SoP_2$ incident Stokes vectors—representing the TE and TM modes—are determined. In this embodiment first row Mueller matrix terms are considered covering, for example, a complete operational wavelength range of a DUT. Therefore, it includes wavelengths outside a main lobe, which also exhibit polarization dependent variations, but have been omitted in the embodiments described above. Furthermore, orthogonality of the SoPs corresponding to $SoP_1$ and $SoP_2$ incident Stokes vectors is ensured by definition. The method is analogous to using an infinitely dense sampling grid on the surface of the Poincaré sphere, but needs only a few operations to yield a result.

The following equations represent the spectral response for a given pair of opposite incident Stokes vectors. The $m_{00}(\lambda)$ $S_0$ terms have been removed from the equations (17) yielding:

$$f'_1(\lambda) = (m_{01}(\lambda)S_1 + m_{02}(\lambda)S_2 + m_{03}(\lambda)S_3)$$

$$f'_2(\lambda) = -(m_{01}(\lambda)S_1 + m_{02}(\lambda)S_2 + m_{03}(\lambda)S_3) \quad (19)$$

The goal is to find a vector $[S_1\ S_2\ S_3]$, which maximizes a difference between the equations for $f'_1(\lambda)$ and $f'_2(\lambda)$. This optimization problem is described by the following equation:

$$\psi = \left(\sum_\lambda (f'_1(\lambda) - f'_2(\lambda))^2\right) \to \max \quad (20)$$

Since $f'_1(\lambda) = -f'_2(\lambda)$, equation (20) is expanded as follows:

$$\psi = \sum_\lambda (2f'_1(\lambda))^2 = \sum_\lambda 4(m_{01}(\lambda)S_1 + m_{02}(\lambda)S_2 + m_{03}(\lambda)S_3)^2 \quad (21)$$

or as:

$$\frac{\psi}{4} = \sum_{\lambda} (m_{01}^2(\lambda)S_1^2 + m_{01}(\lambda)m_{02}(\lambda)S_1S_2 + m_{01}(\lambda)m_{03}(\lambda)S_1S_3 + \quad (22)$$
$$m_{02}(\lambda)m_{01}(\lambda)S_2S_1 + m_{02}^2(\lambda)S_2^2 + m_{02}(\lambda)m_{03}(\lambda)S_2S_3 +$$
$$m_{03}(\lambda)m_{01}(\lambda)S_3S_1 + m_{03}(\lambda)m_{02}(\lambda)S_3S_2 + m_{03}^2(\lambda)S_3^2)$$

Introducing the following notation:

$$M_{ij} \equiv \sum_{\lambda}(m_{0i}(\lambda)m_{0j}(\lambda)) = M_{ji} \quad (23)$$

equation (22) is simplified as:

$$\psi' = (M_{11}S_1^2 + M_{12}S_1S_2 + M_{13}S_1S_3 + M_{21}S_2S_1 + \quad (24)$$
$$M_{22}S_2^2 + M_{23}S_2S_3 + M_{31}S_3S_1 + M_{32}S_3S_2 + M_{33}S_3^2)$$

which is rewritten in matrix form as follows:

$$\psi' = [S_1 \ S_2 \ S_3]\begin{bmatrix} M_{11} & M_{12} & M_{13} \\ M_{21} & M_{22} & M_{23} \\ M_{31} & M_{32} & M_{33} \end{bmatrix}\begin{bmatrix} S_1 \\ S_2 \\ S_3 \end{bmatrix} = \vec{S}^T M \vec{S} \quad (25)$$

Where the matrix M is a symmetric real matrix, since $M_{ij}=M_{ji}$.

The solution of equation (20) is given by the normalized eigenvector $X_i$ of the matrix M having the largest eigenvalue $\mu_i$ which is found using the Jacobi method. Eigenvectors and eigenvalues of a 3×3 matrix are nontrivial solutions of the following equation:

$$M\vec{X}_i = \mu_i \vec{X}_i, i=1,2, \text{ or } 3 \quad (26)$$

It is possible to expand any Stokes vector as follows:

$$\vec{S} = aX_1 + bX_2 + cX_3, \quad (27)$$

where $(a^2+b^2+c^2)=1$. This allows to rewrite equation (20) as:

$$\psi' = \vec{S}^T M \vec{S} \quad (28)$$
$$= (aX_1 + bX_2 + cX_3)^T M(aX_1 + bX_2 + cX_3) \to \max$$
$$= a^2\mu_1 + b^2\mu_2 + c^2\mu_3 \to \max$$

ψ' is maximized by only using the eigenvector with the largest eigenvalue, $\max(\mu_1, \mu_2, \mu_3)$, and by setting the other two components to 0. The resulting vector is then scaled to unit length to ensure that the final result is located on the surface of the Poincaré sphere resulting in a fully polarized SoP. Scaling to unit length does not modify the ratios of linear vertical, horizontal or circular polarizations.

Thus the eigenvector $\vec{S}_i$ with the largest eigenvalue $\mu_i$ maximizes the difference in the orthogonal spectra. The eigenvector $\vec{S}_i$ is then assigned to the $SoP_1$ incident Stokes vector, while its opposite $-\vec{S}_i$ is assigned to the $SoP_2$ incident Stokes vector.

Optionally, the smallest eigenvalue and corresponding eigenvector are selected to determine $SoP_1$ and $SoP_2$ incident Stokes vector representing a SoP having an equal mix of TE and TM modes.

Implementation of this method comprises, for example, the determination of the six $M_{ij}$ terms for a predetermined wavelength range and of the corresponding matrix M. Determination of the eigenvectors and corresponding eigenvalues of the matrix M is then performed using, for example, a built-in eigenvalue solver of a professional programming environment such as LabVIEW™. The largest of the three eigenvalues indicates the corresponding eigenvector which is then used to simulate the spectra corresponding to the opposite $SoP_1$ and $SoP_2$ incident Stokes vectors. Based on the simulated spectra it is then possible to determine appropriate polarization dependent parameters such as PDf and PDL. Again, for DUTs comprising multiple channels it is possible to swap the $SoP_1$ and $SoP_2$ incident Stokes vectors if the dot product of the incident Stokes vectors of adjacent channels is found to be negative.

Figure 16:
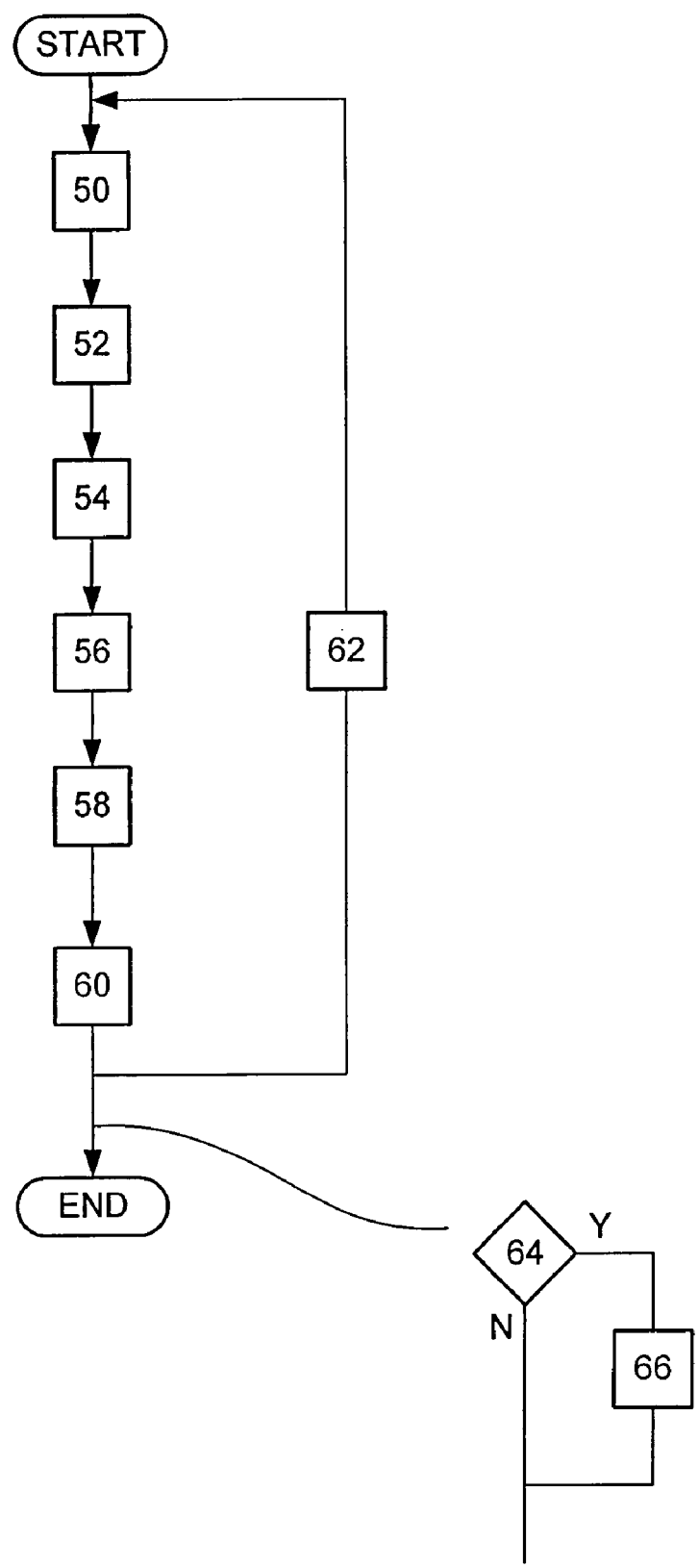
FIG. 16 is a simplified flow diagram of a third embodiment of a method for determining a polarization dependent characteristic of a device according to the invention.

Referring to FIG. 16, a simplified flow diagram of the third embodiment of a method for determining a polarization dependent characteristic of a device is shown. Mueller matrix data indicative of wavelength dependent first row Mueller matrix elements of an optical or opto-electronic device are received—box 50. Using the Mueller matrix data, a matrix M corresponding to a difference between a first and a second transmission spectrum is determined—box 52. The first and the second transmission spectrum correspond to a first Stokes vector and a second Stokes vector, respectively, with the second Stokes vector being opposite to the first Stokes vector. Referring to box 54, eigenvalues of the matrix M are determined, and in box 56 the first Stokes vector is determined by selecting the largest eigenvalue of the matrix M and determining a corresponding eigenvector. The second Stokes vector is then determined as a vector opposite to the first Stokes vector—box 58. Finally, the data indicative of the polarization dependent characteristic of the device are determined using the first and the second Stokes vector and the Mueller matrix data—box 60. In case of a multi-channel device this process is repeated for each of the channels—box 62. Optionally, the first and the second incident Stokes vectors are swapped—box 66—if the dot product of the incident Stokes vectors of adjacent channels is found to be negative—box 64.

It is noted, that the three embodiments of a method for determining a polarization dependent characteristic of a device according to the invention are also applicable using Mueller matrix elements of rows other than the first row, as well as Jones matrix elements. However, as indicated above it is not preferred due to substantially more complex measurements required for obtaining these matrix elements.

Instead of simulating thousands of different incident Stokes vectors on the surface of the Poincaré sphere a pair of extreme incident Stokes vectors is obtained by solving a simple optimization problem substantially reducing computation. This embodiment is highly beneficial by providing highly accurate data related to polarization dependent parameters while simultaneously providing a nearly instantaneous result with minimum computational effort. These advantages allow incorporation of this embodiment into a manufacturing process for determining polarization dependent parameters after predetermined stages of the manufacture of a DUT. For example, it enables fabrication and assembly teams to monitor the impact of different processes on the TE- and TM incident spectra throughout the production line. Using this embodiment manufacturers of optical and opto-electronic devices are enabled to substantially reduce testing costs and turnaround time. It has been found that this method according to the third embodiment is especially valuable for testing planar optical devices such as Arrayed Waveguide (AWG) multiplexers, Reconfigurable Add Drop Modules (ROADMs), wavelength switches, planar splitters and Wavelength Dependent Multiplexers (WDMs).

Figure 17:
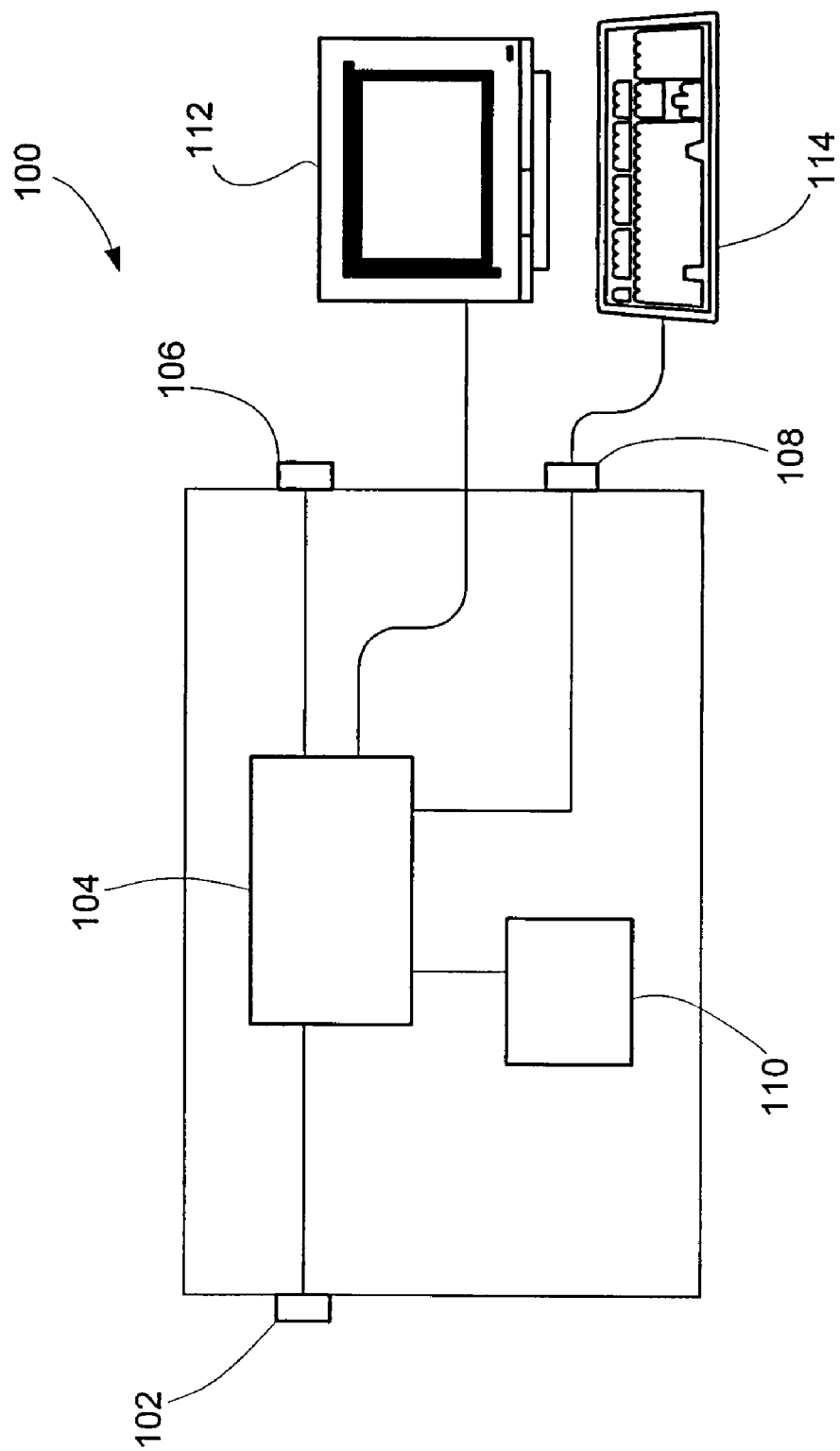
FIG. 17 is a simplified block diagram illustrating a system for determining a polarization dependent characteristic of a device according to the invention.
Figure 18:
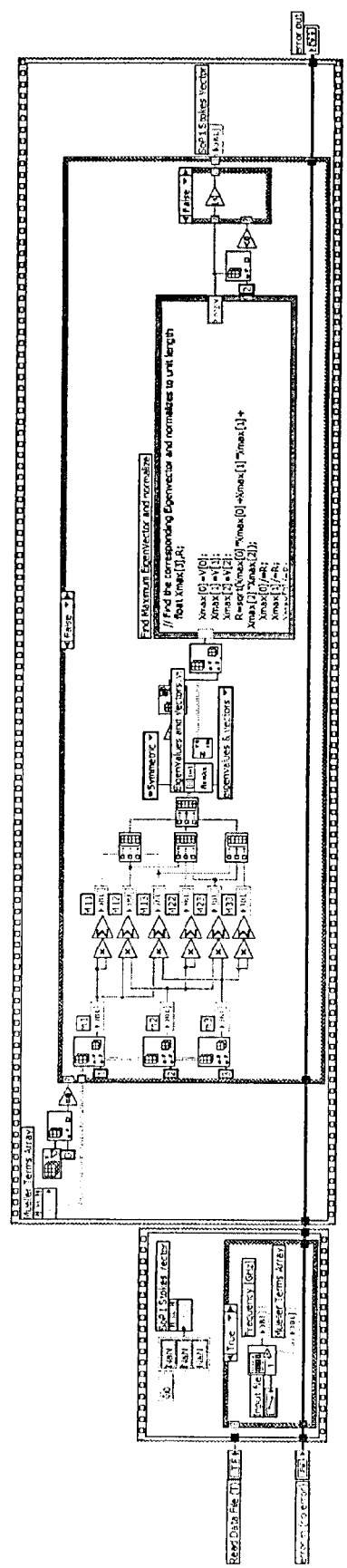
FIG. 18 is a diagram an implementation of the third embodiment of a method for determining a polarization dependent characteristic of a device according to the invention.
Figure 19:
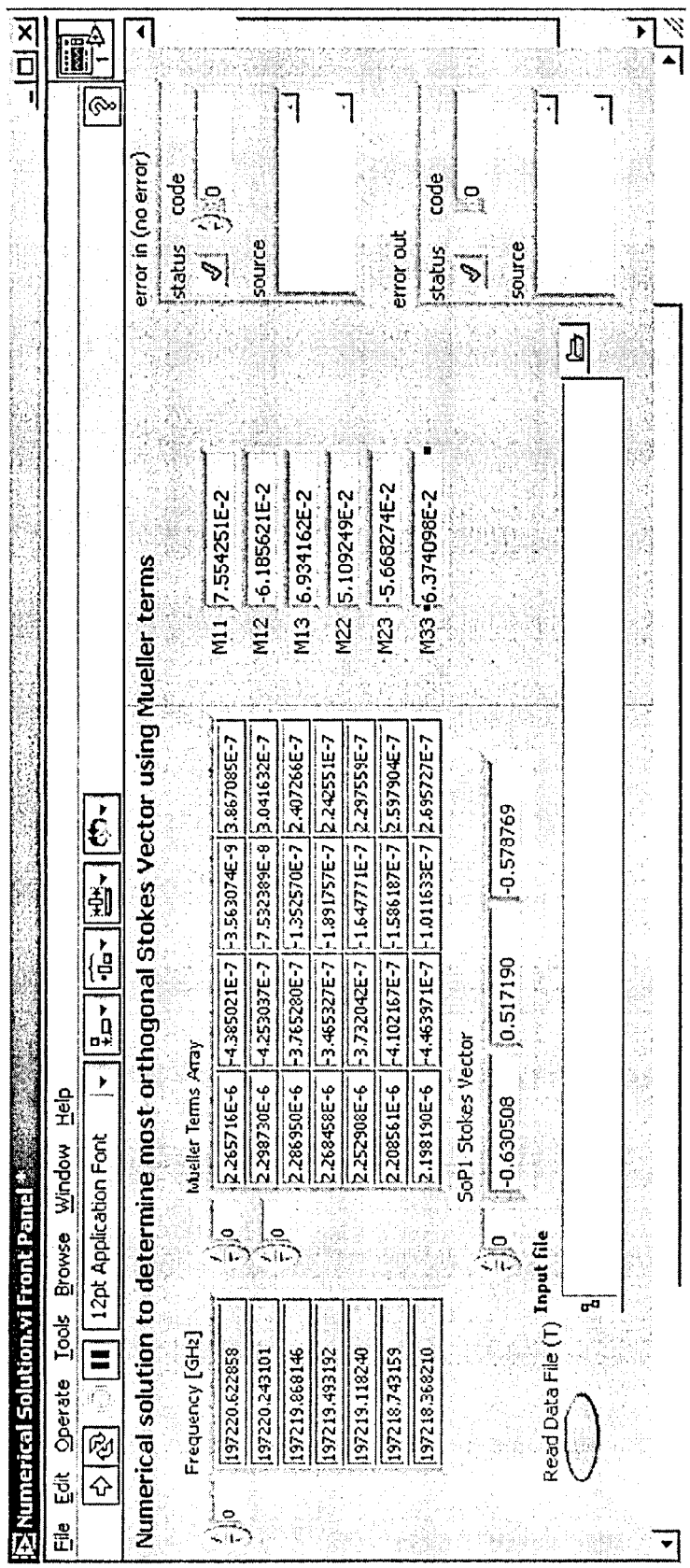
FIG. 19 is a diagram illustrating a graphical user interface for implementation with the third embodiment of a method for determining a polarization dependent characteristic of a device according to the invention.

Referring to FIG. 17, a system 100 for determining a polarization dependent characteristic of a device according to the invention is shown. The Mueller matrix data are received at input port 102. Using electronic circuitry such as a processor 104 the Mueller matrix data are then digitally processed, according to one of the three embodiments as outlined above. The system 100 further comprises a storage medium 110 having stored therein executable commands for execution on the processor 104 for performing the data processing. Alternatively, the processor 104 comprises electronic circuitry designed for performing at least a portion of the data processing in a hardware implemented fashion, as shown in a diagram in FIG. 18. The system 100 further comprises an output port 106 for providing the processed signal data for storage or further processing. User interaction such as provision of parameter values for determining wavelength ranges and step sizes is provided, for example, via a graphical representation—for example, as shown in FIG. 19—on display 112 and provision of control commands via port 108—connected, for example, to a keyboard 114—to the processor 104. Preferably, the display 112 is a graphical user interface facilitating user interaction during data processing. The data indicative of the polarization dependent characteristic of the device as well as corresponding spectra are, for example, graphically displayed on the display 112.

Figure 20A:
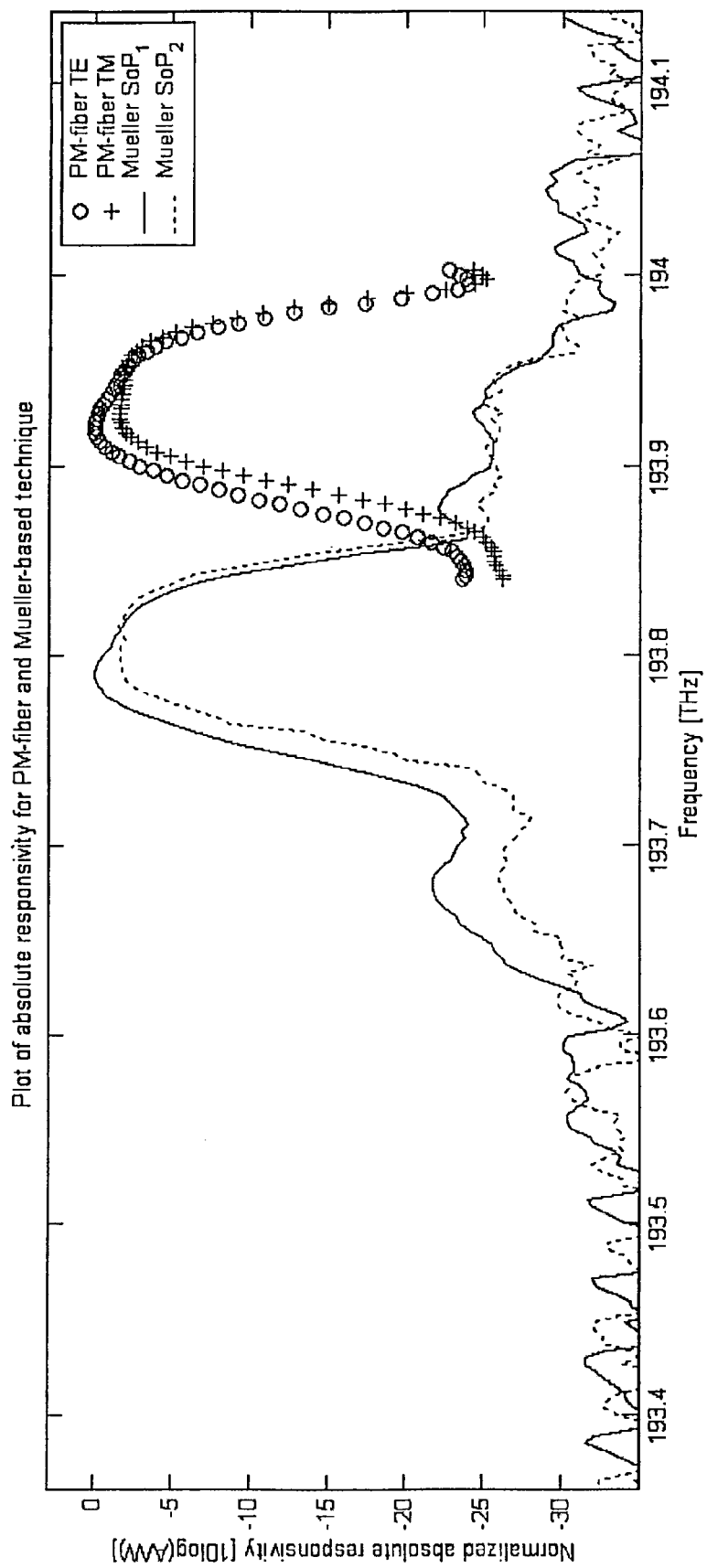
FIGS. 20a and 20b are diagrams illustrating absolute responsivity versus frequency for comparing simulated and measured spectra.
Figure 20B:
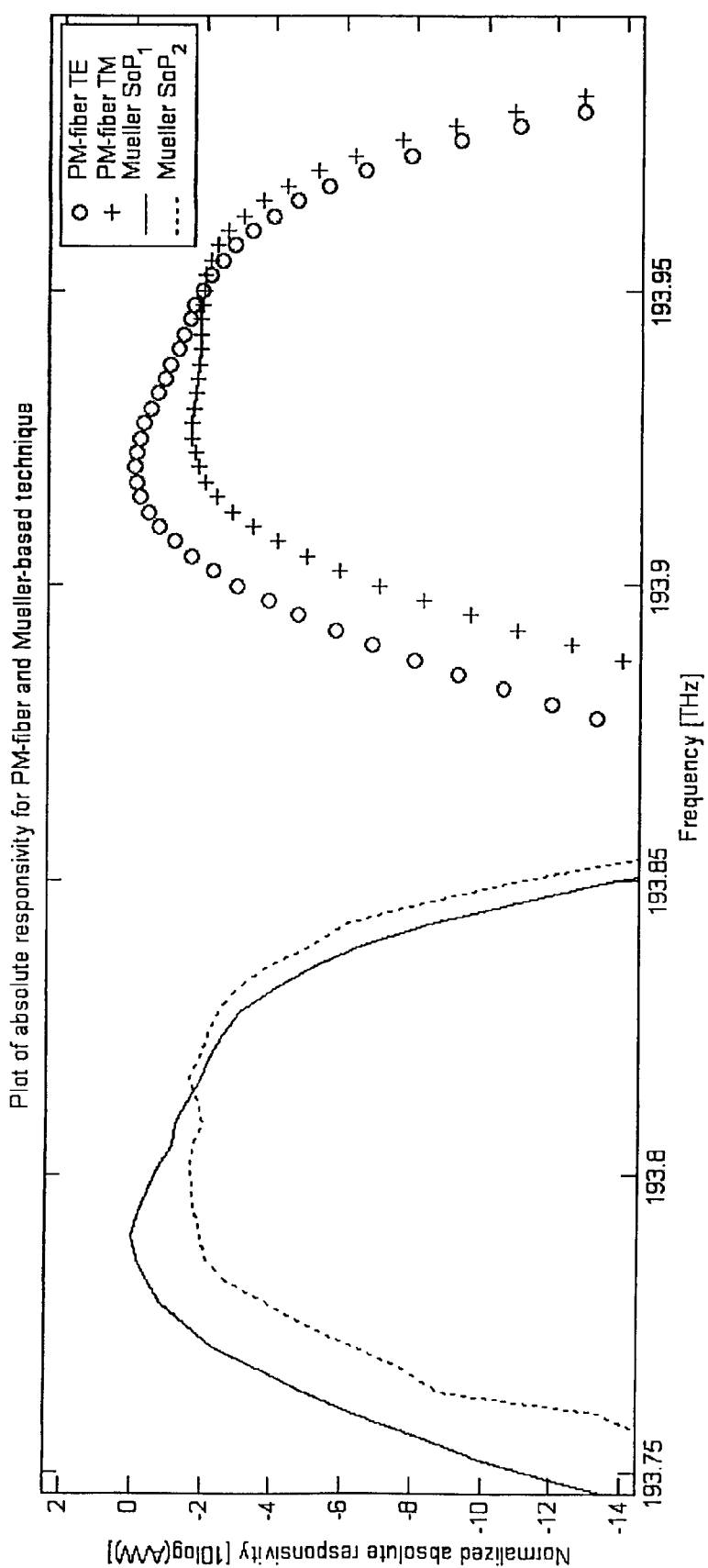
Figure 20C:
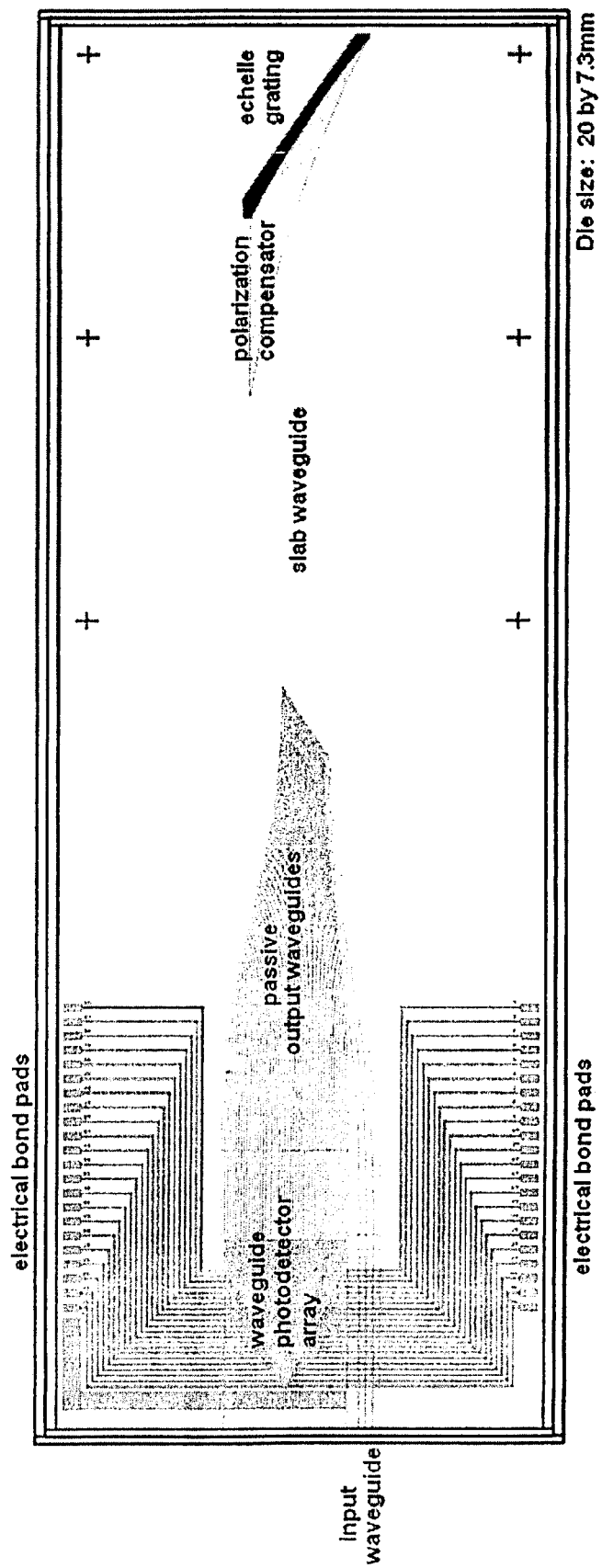
FIG. 20c is a simplified block diagram illustrating a SurePath Monitor™ die for measuring the spectra used in FIGS. 20a and 20b.
Figure 21A:
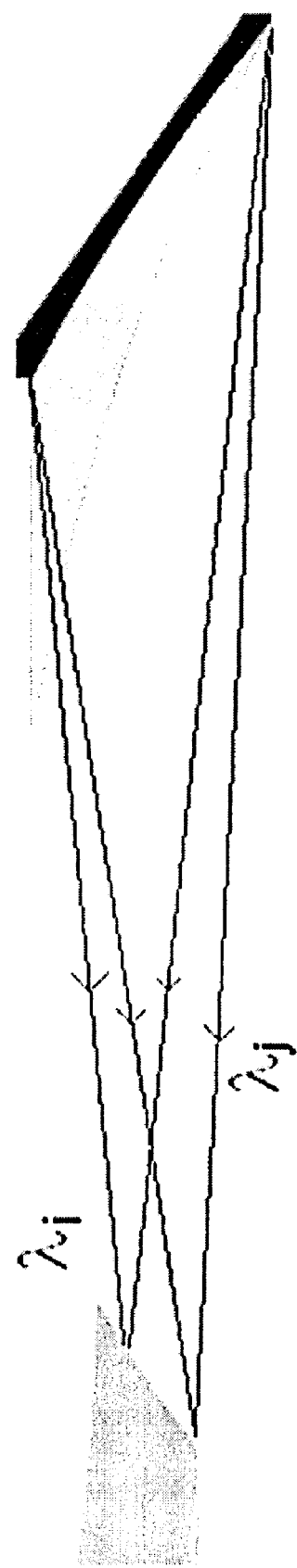
FIG. 21a is a simplified diagram illustrating echelle grating diffraction.
Figure 21B:
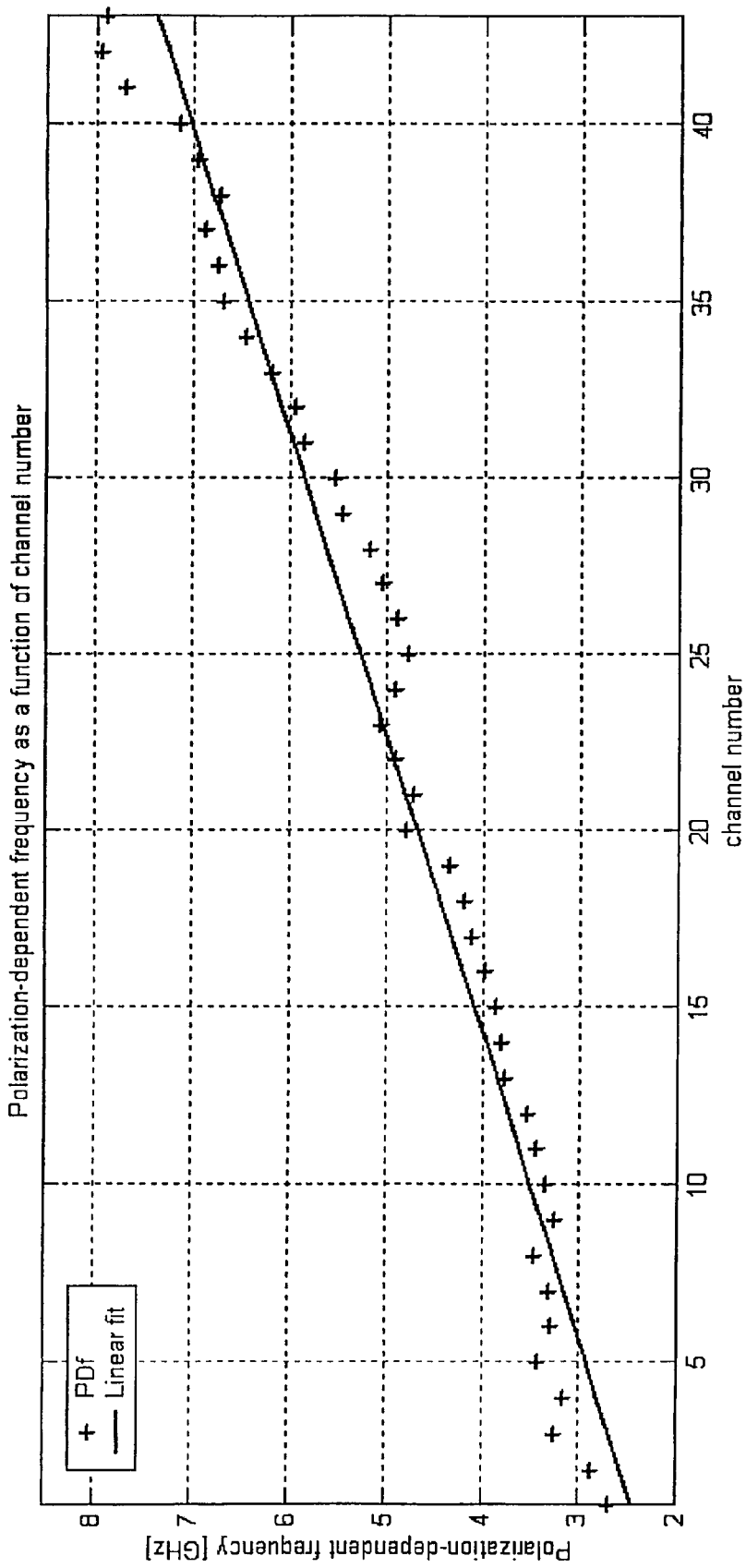
FIG. 21b is a diagram illustrating PDf versus channel number for a multi-channel device.

The simulated spectra obtained using the above method have been compared to TE and TM modes spectra obtained from Polarization Maintaining (PM) fiber measurements with known incident SoPs. While the coupling efficiency difference of the TE and TM modes is more pronounced for PM-fiber measurements, comparison of the normalized responsivity and filter shape is performed by measuring the input power using a bare-fiber adapter and an optical integration sphere. FIGS. 20a and 20b show absolute responsivity measurement results of one of the center channels of a SurePath Monitor™ die, shown in FIG. 20c, attached to a ceramic carrier, obtained from extracted Mueller matrix terms and PM-fiber measurements. An offset of 150 GHz was added to ease the comparison of both techniques. As is evident, the $SoP_1$ and $SoP_2$ spectra match the TE and TM spectra measured with the PM-fiber. The PM-fiber measurements have been performed over a shorter wavelength range due to the longer testing time and to avoid decoupling. Another technique to evaluate the accuracy of the above method is to review the PDf of the SurePath Monitor™ as a function of channel number. The geometric shape of the polarization compensator yields repeatable slopes of the resulting PDf results, while the nominal values depend largely on residual strain or external stress effects applied on the DUT's slab waveguide area. As seen in FIG. 21a, following the echelle-grating diffraction, different wavelengths travel through different compensator areas, hence their PDf is over- or under-compensated. The nominal polarization compensator design yields a variation of approximately 5 GHz from channel 1 to channel 43, following a positive slope when the PDf is defined in absolute terms. As shown in FIG. 21b, the variation in absolute PDf results closely matches the expected variation of approximately 5 GHz, shown as a linear regression.

Numerous other embodiments of the invention will be apparent to persons skilled in the art without departing from the spirit and scope of the invention as defined in the appended claims.

What is claimed is:

1. A method for determining a polarization dependent characteristic of a device comprising:
   a) receiving Mueller matrix data, the Mueller matrix data being indicative of wavelength dependent first row Mueller matrix elements of the device, the device being one of an optical and an opto-electrical device;
   b) using the Mueller matrix data, determining a matrix M corresponding to a difference between a first and a second transmission spectrum, the first and the second transmission spectrum corresponding to a first Stokes vector and a second Stokes vector, respectively, with the second Stokes vector being opposite to the first Stokes vector;
   c) determining eigenvalues of the matrix M;
   d) determining the first Stokes vector by selecting the largest eigenvalue of the matrix M and determining a corresponding eigenvector;
   e) determining the second Stokes vector, the second Stokes vector being a vector opposite to the eigenvector; and,
   f) determining data indicative of the polarization dependent characteristic of the device using the first and second Stokes vector and the Mueller matrix data.

2. A method for determining a polarization dependent characteristic of a device as defined in claim 1 wherein d) comprises scaling the first Stokes vector to unit length.

3. A method for determining a polarization dependent characteristic of a device as defined in claim 2 wherein the matrix M comprises a 3×3 matrix.

4. A method for determining a polarization dependent characteristic of a device as defined in claim 2 wherein the eigenvalues are determined using a Jacobi method.

5. A method for determining a polarization dependent characteristic of a device as defined in claim 2 wherein the first and the second transmission spectrum comprises a predetermined wavelength range.

6. A method for determining a polarization dependent characteristic of a device as defined in claim 5 wherein the predetermined wavelength range comprises a complete operational wavelength range of the device.

7. A method for determining a polarization dependent characteristic of a device as defined in claim 5 wherein the polarization dependent characteristic comprises one of polarization dependent loss and polarization dependent frequency.

8. A method for determining a polarization dependent characteristic of a device as defined in claim 1 wherein the device comprises a plurality of channels, the method comprising: repeating a) to f) for each of the plurality of channels.

9. A method for determining a polarization dependent characteristic of a device as defined in claim 8 wherein for each of the plurality of channels the first and the second transmission spectrum comprises a complete operational range of the corresponding channel.

10. A method for determining a polarization dependent characteristic of a device as defined in claim 8 comprising: swapping the first and the second incident Stokes vector of one channel if a dot product of corresponding incident Stokes vectors of the channel and an adjacent channel is negative.

11. A method for determining a polarization dependent characteristic of a device as defined in claim 8 wherein the polarization dependent characteristic comprises one of polarization dependent loss and polarization dependent frequency for each of the plurality of channels.

12. A storage medium having stored therein executable commands for execution on a processor, the processor when executing the commands performing:
 receiving Mueller matrix data, the Mueller matrix data being indicative of wavelength dependent first row Mueller matrix elements of one of an optical and an opto-electrical device;
 using the Mueller matrix data, determining a matrix M corresponding to a difference between a first and a second transmission spectrum, the first and the second transmission spectrum corresponding to a first Stokes vector and a second Stokes vector, respectively, with the second Stokes vector being opposite to the first Stokes vector;
 determining eigenvalues of the matrix M;
 determining the first Stokes vector by selecting the largest eigenvalue of the matrix M and determining a corresponding eigenvector;
 determining the second Stokes vector, the second Stokes vector being a vector opposite to the eigenvector; and,
 determining data indicative of the polarization dependent characteristic of the device using the first and second Stokes vector and the Mueller matrix data.

13. A system for determining a polarization dependent characteristic of a device comprising:
 an input port for receiving Mueller matrix data, the Mueller matrix data being indicative of wavelength dependent first row Mueller matrix elements of the device, the device being one of an optical and an opto-electrical device;
 a processor in communication with the first port for:
  a) using the Mueller matrix data, determining a matrix M corresponding to a difference between a first and a second transmission spectrum, the first and the second transmission spectrum corresponding to a first Stokes vector and a second Stokes vector, respectively, with the second Stokes vector being opposite to the first Stokes vector;
  b) determining eigenvalues of the matrix M;
  c) determining the first Stokes vector by selecting the largest eigenvalue of the matrix M and determining a corresponding eigenvector;
  d) determining the second Stokes vector, the second Stokes vector being a vector opposite to the eigenvector; and,
  e) determining data indicative of the polarization dependent characteristic of the device using the first and second Stokes vector and the Mueller matrix data; and,
 an output port in communication with the processor for providing the data indicative of the polarization dependent characteristic of the device.

14. A system for determining a polarization dependent characteristic of a device as defined in claim 12 wherein the processor comprises electronic circuitry designed for performing at least a portion of a) to e).

15. A system for determining a polarization dependent characteristic of a device as defined in claim 12 comprising a control port in communication with the processor for receiving control commands for controlling a) to e).

16. A system for determining a polarization dependent characteristic of a device as defined in claim 14 comprising a graphical display in communication with the processor for displaying the data indicative of the polarization dependent characteristic in a graphical fashion.

17. A system for determining a polarization dependent characteristic of a device as defined in claim 15 wherein the graphical display comprises a graphical user interface.

18. A method for determining a polarization dependent characteristic of a device comprising:
 a) receiving Mueller matrix data, the Mueller matrix data being indicative of wavelength dependent first row Mueller matrix elements of the optical device, the device being one of an optical and an opto-electrical device;
 b) determining a set of first Stokes vectors and a set of second Stokes vectors, each Stokes vector of the set of second Stokes vectors being opposite to a corresponding Stokes vector of the set of first Stokes vectors, the set of first Stokes vectors substantially covering a surface of a hemisphere of a Poincaré sphere;
 c) using the Mueller matrix data, determining for the first Stokes vector and the second Stokes vector of each pair of opposite first and second Stokes vectors a corresponding first and second transmission spectrum;
 d) determining for each pair of opposite first and second Stokes vectors a normalized difference between the corresponding first and second transmission spectrum;
 e) determining the pair of opposite first and second Stokes vectors having the largest normalized difference; and,
 f) determining data indicative of the polarization dependent characteristic of the device using the pair of opposite first and second Stokes vectors having the largest normalized difference and the Mueller matrix data.

19. A method for determining a polarization dependent characteristic of a device as defined in claim 17 wherein b) to e) are performed for predetermined wavelengths in a predetermined wavelength range, the predetermined wavelength range being smaller than an operational wavelength range of the device.

20. A method for determining a polarization dependent characteristic of a device as defined in claim 18 wherein f) the determination of the data indicative of the polarization dependent characteristic is performed for predetermined wavelengths in the complete operational wavelength range of the device.

21. A method for determining a polarization dependent characteristic of a device as defined in claim 19 wherein the device comprises a plurality of channels, the method comprising:
 repeating a) to f) for each of the plurality of channels.

22. A method for determining a polarization dependent characteristic of a device comprising:
 receiving Mueller matrix data, the Mueller matrix data being indicative of wavelength dependent first row Mueller matrix elements of the optical device, the device being one of an optical and an opto-electrical device;
 using the Mueller matrix data, determining a set of insertion loss data and a set of center frequency data for each of a plurality of input states of polarization substantially covering a surface of a Poincaré sphere;
 processing the set of insertion loss data and the set of center frequency data for determining extremes of insertion loss and extremes of center frequency;
 determining a first and a second incident Stokes vector for each of the extremes of the insertion loss and the extremes of the center frequency;
 determining an orthogonality parameter for the first and the second incident Stokes vector for each of the extremes of the insertion loss and the extremes of the center frequency, the orthogonality parameter having a predetermined value for indicating othogonality;

selecting the extreme and the corresponding first and second incident Stokes vector associated with the orthogonality parameter closest to the predetermined value; and, determining data indicative of the polarization dependent characteristic of the device using the selected first and second incident Stokes vector and the Mueller matrix data.

23. A method for determining a polarization dependent characteristic of a device comprising:

receiving matrix data indicative of a wavelength dependent influence of the device on a light wave transmitted therethrough, the device being one of an optical and an opto-electrical device;

determining a set of first Stokes vectors and a set of second Stokes vectors, each Stokes vector of the set of second Stokes vectors being opposite to a corresponding Stokes vector of the set of first Stokes vectors;

using the matrix data, determining for the first Stokes vector and the second Stokes vector of each pair of opposite first and second Stokes vectors a corresponding first and second transmission spectrum;

determining for each pair of opposite first and second Stokes vectors a normalized difference between the corresponding first and second transmission spectrum;

determining the pair of opposite first and second Stokes vectors having the largest normalized difference; and, determining data indicative of the polarization dependent characteristic of the device using the pair of opposite first and second Stokes vectors having the largest normalized difference and the matrix data.

24. A method for determining a polarization dependent characteristic of a device as defined in claim 22 wherein the matrix data comprise elements of a row of a Mueller matrix.

* * * * *

UNITED STATES PATENT AND TRADEMARK OFFICE
CERTIFICATE OF CORRECTION

PATENT NO.        : 7,471,378 B2
APPLICATION NO. : 11/427985
DATED             : December 30, 2008
INVENTOR(S)      : Desfonds et al.

It is certified that error appears in the above-identified patent and that said Letters Patent is hereby corrected as shown below:

Col. 1, Line 24, change "satisy" to --satisfy--: change "modem" to --modern--.

Col. 5, line 64, change "spectrum in" to --spectrum. In--.

Col. 19, Claim 14, line 58 change "claim 12" to --claim 13--.

Col. 19, Claim 15, line 62 change "claim 12" to --claim 13--.

Col. 19, Claim 16, line 66 change "claim 14" to --claim 15--.

Col. 20, Claim 17, line 4 change "claim 15" to --claim 16--.

Col. 20, Claim 19, line 32 change "claim 17" to --claim 18--.

Col. 20, Claim 20, line 38 change "claim 18" to --claim 19--.

Col. 20, Claim 21, line 45 change "claim 19" to --claim 20--.

Col. 22, Claim 24, line 16 change "claim 22" to --claim 23--.

Signed and Sealed this

Third Day of March, 2009

JOHN DOLL
*Acting Director of the United States Patent and Trademark Office*